(12) United States Patent
Nose et al.

(10) Patent No.: US 8,199,094 B2
(45) Date of Patent: Jun. 12, 2012

(54) DISPLAY DEVICE DRIVING METHOD AND DISPLAY DEVICE

(75) Inventors: Masaki Nose, Kawasaki (JP); Hisashi Yamaguchi, Atsugi (JP)

(73) Assignee: Fujitsu Limited, Kawasaki (JP)

( * ) Notice: Subject to any disclaimer, the term of this patent is extended or adjusted under 35 U.S.C. 154(b) by 449 days.

(21) Appl. No.: 12/572,742

(22) Filed: Oct. 2, 2009

(65) Prior Publication Data
US 2010/0020055 A1    Jan. 28, 2010

Related U.S. Application Data

(63) Continuation of application No. PCT/JP2007/000473, filed on Apr. 27, 2007.

(51) Int. Cl.
G09G 3/36    (2006.01)
(52) U.S. Cl. ............. 345/96; 345/89; 345/690; 345/204
(58) Field of Classification Search ............ 345/87–102, 345/204, 211, 209, 210, 690
See application file for complete search history.

(56) References Cited

U.S. PATENT DOCUMENTS

| | | | |
|---|---|---|---|
| 5,576,729 A | 11/1996 | Yamazaki | |
| 5,818,408 A * | 10/1998 | Mihara et al. | 345/94 |
| 6,072,451 A | 6/2000 | Mano et al. | |
| 6,304,242 B1 * | 10/2001 | Onda | 345/99 |
| 6,822,631 B1 | 11/2004 | Yatabe | |
| 6,950,086 B2 * | 9/2005 | Nagai et al. | 345/95 |
| 7,068,253 B2 * | 6/2006 | Kudo et al. | 345/99 |
| 7,705,808 B2 * | 4/2010 | Jeon et al. | 345/74.1 |
| 2002/0021271 A1 | 2/2002 | Sakamoto | |
| 2006/0124897 A1 | 6/2006 | Shingai et al. | |

FOREIGN PATENT DOCUMENTS

| | | |
|---|---|---|
| JP | 11-84342 A | 7/1989 |
| JP | 2-006993 A | 1/1990 |
| JP | 5-210356 A | 8/1993 |
| JP | 2001-147671 A | 5/2001 |
| WO | 93/23845 A1 | 11/1993 |
| WO | 2005/024774 A1 | 3/2005 |

OTHER PUBLICATIONS

International Search Report for PCT/JP2007/000473, mailing date of Jun. 5, 2007.

* cited by examiner

*Primary Examiner* — Duc Dinh
(74) *Attorney, Agent, or Firm* — Westerman, Hattori, Daniels & Adrian, LLP

(57) ABSTRACT

A display device includes a liquid crystal display panel having a first and second substrates with scanning electrodes and data electrodes and a liquid crystal layer; a scanning electrode driving circuit applying to the scanning electrodes scan pulse; a data electrode driving circuit applying to the data electrodes data pulses having combinations of different voltage levels according to write data; and a driving control circuit supplying to the scanning and data electrode driving circuits a pulse control signal controlling the phase of the scan pulses and data pulses. The scanning and data electrode driving circuits control the scan pulses and data pulses at voltage levels according to the pulse control signal, and the driving control circuit inverts or does not invert the phase of the pulse control signal, at each application interval of the scan pulses, according to the number of changed values and unchanged values of the write data.

12 Claims, 23 Drawing Sheets

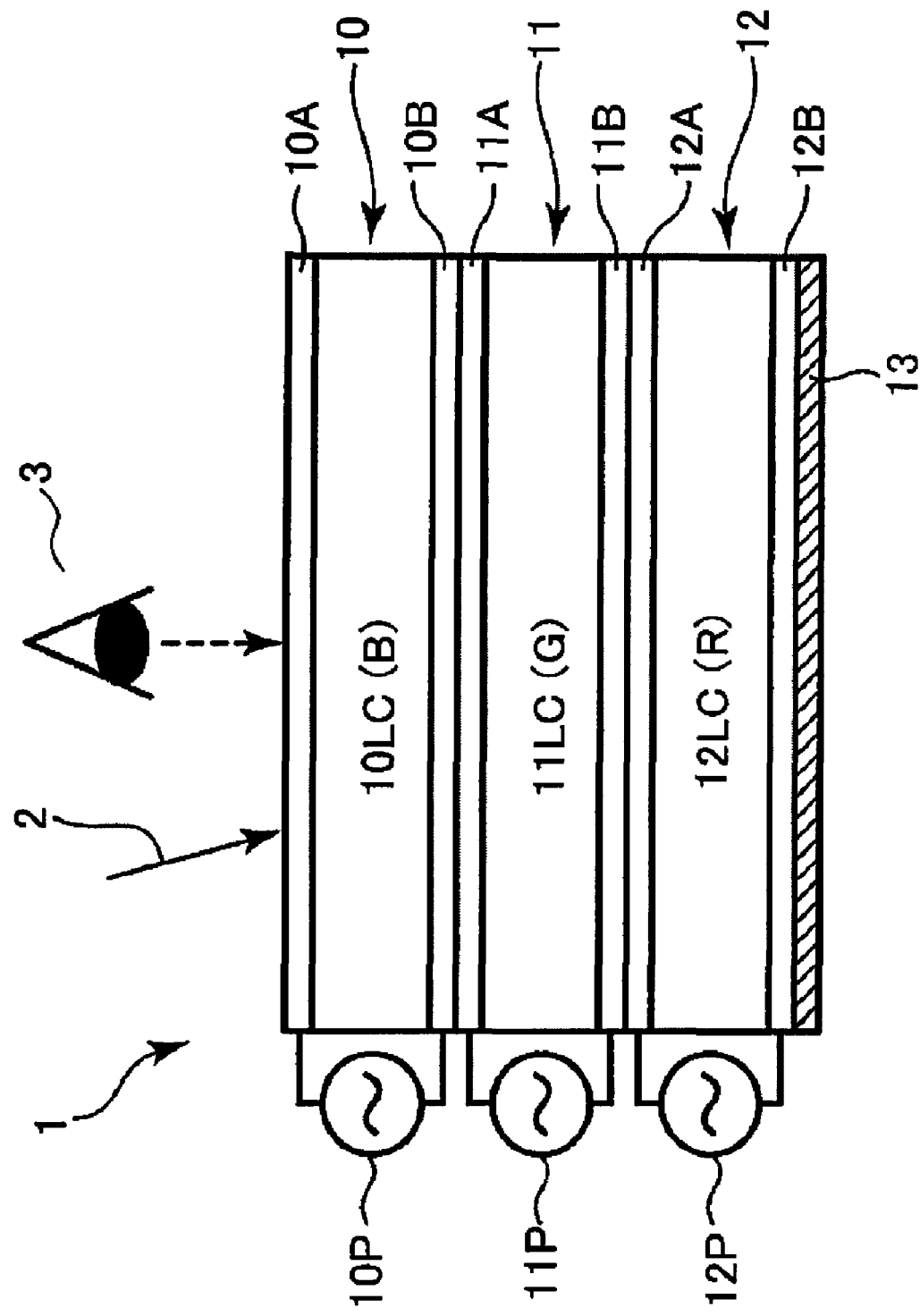

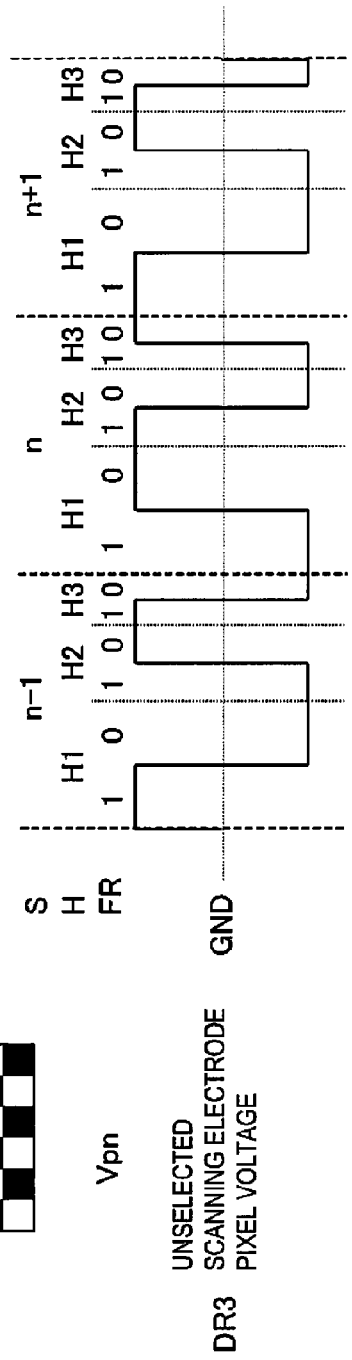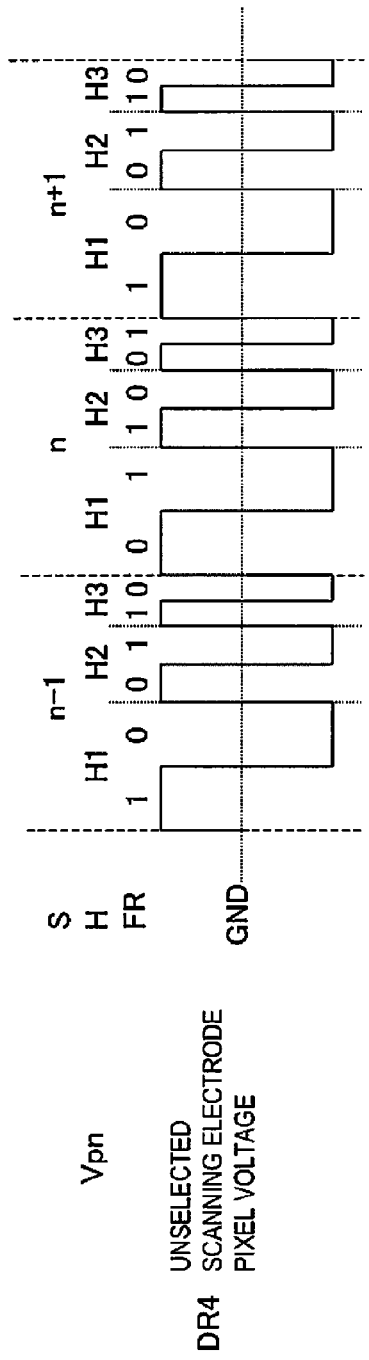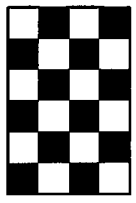
FIG. 21

DISPLAY DEVICE DRIVING METHOD AND DISPLAY DEVICE

CROSS REFERENCE TO RELATED APPLICATIONS

This application is a continuation of International Application No. PCT/JP2007/000473, filed on Apr. 27, 2007, now pending, herein incorporated by reference.

FIELD

This invention relates to a display device.

BACKGROUND

Electronic paper has been proposed for applications in electronic books, the sub-displays of mobile terminal equipment, the display portions of IC cards, and numerous other portable equipment. One display device which is promising for use in electronic paper employs liquid crystal mixtures forming a cholesteric phase (called cholesteric liquid crystals, or chiral nematic liquid crystals; in this Specification, the term "cholesteric liquid crystals" is used). Cholesteric liquid crystals have such excellent features as semi-permanent display maintenance characteristics (memory characteristics), vivid color display characteristics, high contrast characteristics, and high resolution characteristics.

FIG. 1 depicts the cross-sectional configuration of a liquid crystal display device using cholesteric liquid crystals and capable of full-color display. The liquid crystal display device 1 has a structure in which are layered, in sequence from the display face on the side of the user 3, a blue display portion 10, green display portion 11, red display portion 12. In the figure, the upper substrate side is the display face; ambient light 2 is incident from above the substrate on the display face.

The blue display portion 10 has liquid crystals for blue display 10LC sealed between a pair of upper and lower substrates 10A and 10B, and a driving circuit 10P which applies prescribed voltage pulses to the blue liquid crystal layer 10LC. The green display portion 11 has liquid crystals for green display 11LC sealed between a pair of upper and lower substrates 11A and 11B, and a driving circuit 11P which applied prescribed voltage pulses to the green liquid crystal layer 11C. And, the red display portion 12 also has liquid crystals for red display 12LC sealed between a pair of upper and lower substrates 12A and 12B, and a driving circuit 12P which applies prescribed voltage pulses to the red liquid crystal layer 12LC. A light absorption layer 13 is arranged on the rear face of the lower substrate 12B of the red display portion 12.

The cholesteric liquid crystals used in each of the blue, green, and red liquid crystal layers 10LC, 11LC, 12LC are liquid crystal mixtures in which chiral additives (also called chiral materials) are added in relatively large amounts of several tens of weight percent to nematic liquid crystals. When relatively large amounts of chiral materials are intermixed with nematic liquid crystals, a cholesteric phase can be formed in which nematic liquid crystal molecules are strongly twisted in a helical shape. Consequently cholesteric liquid crystals are also called chiral nematic liquid crystals.

Cholesteric liquid crystals have bistable (memory) properties, and by regulating the strength of the electric field applied to the liquid crystals, can assume a planar state (reflecting state), focal conic state (transmitting state), or a state intermediate between these through intermixing thereof. And, once cholesteric liquid crystals have assumed a planar state, a focal conic state, or a state intermediate therebetween, that state is held with stability even after the electric field is no longer applied.

The planar state is for example obtained by applying a prescribed high voltage across the upper and lower substrates to impart a strong electric field to the liquid crystal layer, and after putting the liquid crystals into the homeotropic state, suddenly reducing the electric field to zero. The focal conic state is for example obtained by applying a prescribed voltage, lower than the above high voltage, across the upper and lower substrates to impart an electric field to the liquid crystal layer, and then suddenly reducing the electric field to zero. Or, the focal conic state can also be obtained by gradually increasing the voltage from the planar state. A state intermediate between the planar state and the focal conic state can for example be obtained by applying, across the upper and lower substrates, a voltage lower than the voltage used to obtain the focal conic state, to impart an electric field to the liquid crystal layer, and then suddenly reducing the electric field to zero.

FIG. 2A and FIG. 2B depict the principle of display of liquid crystal display devices using cholesteric liquid crystals. In FIG. 2A and FIG. 2B, an example of a blue display portion is explained. FIG. 2A depicts a state of orientation of cholesteric liquid crystal molecules LC when the liquid crystals for blue display 10LC of the blue display portion 10 are in the planar state. As depicted in FIG. 2A, the liquid crystal molecules LC in the planar state sequentially rotate in the substrate thickness direction to form a helical structure, and the helical axis of this helical structure is substantially perpendicular to the plane of the substrates.

In the planar state, light at a prescribed wavelength according to the helical pitch of the liquid crystal molecules is selectively reflected by the liquid crystal layer. If the average refractive index of the liquid crystal layer is n, and the helical pitch is p, then the wavelength λ of maximum reflection is given by λ=n·p. Hence if the average refractive index n and helical pitch p are determined such that for example λ=480 nm, then the blue liquid crystal layer 10LC of the blue display portion 10 selectively reflect blue light when in the planar state. The average refractive index n can be adjusted by selecting the liquid crystal material and chiral material, and the helical pitch p can be adjusted by adjusting the chiral material content.

FIG. 2B depicts the state of orientation of cholesteric liquid crystal molecules when the blue liquid crystal layer LC of the blue display portion 10 is in the focal conic state. As depicted in FIG. 2B, liquid crystal molecules in the focal conic state rotate successively in substrate in-plane directions, forming a helical structure, and the helical axis of the helical structure is substantially parallel to the substrate plane. In the focal conic state, the reflection wavelength selectivity of the blue liquid crystal layer 10LC is lost, and nearly all incident light 2 is transmitted. And, transmitted light is absorbed by the light absorption layer 13 provided on the rear face of the lower substrate 12B of the red display portion 12, so that a dark color (black) is displayed.

In a state intermediate between the planar state and the focal conic state, the proportion of reflected light to transmitted light can be adjusted according to the state, so that the intensity of reflected light can be varied. Thus when using cholesteric liquid crystals, the amount of reflected light can be controlled through the state of orientation of liquid crystal molecules twisted in a helical shape.

Similarly to the above-described blue liquid crystal layer, when cholesteric liquid crystals which selectively reflect green or red light while in the planar state are sealed into the green liquid crystal layer and red liquid crystal layer respectively, a full-color liquid crystal display device can be realized.

Using cholesteric liquid crystals as described above, by layering liquid crystal display panels which selectively reflect red, green, and blue light, a full-color display device with memory properties is possible, and color display with zero power consumption except when performing screen rewrites is possible.

FIG. 3 depicts reflectivity characteristics versus driving voltage for cholesteric liquid crystals. When a strong electric field (high voltage V1) is applied to liquid crystals, the helical structure of the liquid crystal molecules is completely undone, and all the molecules enter the homeotropic state HT, conforming to the direction of the electric field. When the electric field is suddenly dropped to zero from the homeotropic state HT, the liquid crystal helical axis becomes perpendicular, and the planar state PL is entered. On the other hand, when, from the planar state PL, an electric field (voltage V2) is applied which is sufficiently weak so that the liquid crystal molecule helical structure is not undone, and then the electric field is removed, the focal conic state FC results. And, when an intermediate electric field (voltages V4, V3) is applied and then suddenly removed, an intermediate state, in which the planar state and the focal conic state are intermixed, results.

When liquid crystals are driven using voltage pulses, if the initial state is the planar state PL, then if the pulse voltage is approximately the voltage V2 the focal conic state FC can be induced, and if the pulse voltage is set higher to the voltage V1 the planar state PL can be induced. If the initial state is the focal conic state FC, when the pulse voltage is set to approximately the voltage V2 the focal conic state FC can be induced, and when the pulse voltage is set higher to the voltage V1 the planar state PL can be induced. And, by applying a voltage in a grayscale region A, B from the planar state PL, a grayscale state can be induced.

On the other hand, the driving waveform may be made an alternating current waveform in order to suppress degradation of the liquid crystal material. By using AC driving, image sticking due to the liquid crystal material can be suppressed, and the lifetime of the liquid crystal material can be extended. In general liquid crystal display panels which display video and similar, a frame inversion method which inverts the pulse polarity for each frame, and a line inversion method which inverts the pulse polarity for each scan line, are adopted. In such methods, an AC voltage can be applied to the liquid crystal material, to which positive pulses and negative pulses are applied in alternation over intervals of a plurality of frames.

However, display panels using cholesteric liquid crystals employed in electronic paper perform rewriting of the display image corresponding to image data in one frame or a plurality of frames, and moreover the frequency of image rewriting is extremely low. Hence the above-described frame inversion method and scan line inversion method are not suited to cholesteric liquid crystal display panels.

Hence in a cholesteric liquid crystal display panel used in electronic paper, an inline inversion method, in which the pulse polarity is inverted within each scan line, is applied. In the inline inversion method, one scanning electrode is selected and driven, and positive and negative electric fields are applied to the liquid crystals within a scan interval by applying voltages corresponding to the data from the data line. By means of this method, complete AC pulses are applied to all the pixels even in rewriting the display image for one frame, so that degradation of the liquid crystal material can be suppressed, and the lifetime can be extended.

However, in the inline inversion method, the polarity of driving pulses may be inverted within each scan interval, and the increase in power consumption accompanying polarity inversion is a serious problem. As a method of suppressing this power consumption, FIG. 57 in Patent Reference 1 (JP WO 2005/024774 A1) describes a method of inverting by 180° the phase of AC driving pulses at each scan interval, and reducing by half the frequency of AC driving pulses in a panel.

FIG. 4 depicts pulse control signals which control the polarity of driving pulses described in Patent Reference 1. The pulse control signals FR are control signals applied to a driving circuit; the voltage level of driving pulses output by the driving circuit is controlled according to the pulse control signals FR. Hence by making the pulse control signals FR signals (H,L) in each scan interval as in the case of FR1, both a positive electric field and a negative electric field can be applied to the liquid crystal material. On the other hand, by inverting the phase by 180° at each scan interval as in (H,L), (L,H), (H,L) as in the case of FR2, the electric field can be inverted at each scan interval without inverting the electric field applied to the liquid crystals between scan intervals, so that the frequency of the AC electric field applied to the panel can be halved. In this way, by inverting the phase at each scan interval of the pulse control signals FR, the number of times the liquid crystals are charged and discharged can be reduced, and power consumption by the panel can be suppressed.

However, the inventors have discovered that, in the method of FIG. 4, while the power reduction effect is substantial for images with extensive white portions, such as in the display of text, on the other hand, in the case of images for which there are dramatic changes in density upon each image rewrite, the power reduction effect is smaller. That is, the driving circuit comprises a scanning electrode driving circuit which drives scanning electrodes extending in the horizontal direction of the liquid crystal panel, and a data electrode driving circuit which drives data electrodes extending in the vertical direction, and an electric field corresponding to the difference between a scan pulse and a data pulse is applied to the liquid crystals. Together with this, it was discovered that, if the voltage of unselected scan pulses is set to the intermediate value of the ON and OFF data pulse voltages, the polarity of the electric field applied to liquid crystals at unselected scan electrodes is reversed for data ON and OFF values, and the reduction in power consumption in the liquid crystal panel is different depending on a type of rewrite image.

SUMMARY

According to an aspect of embodiments, a display device, includes: a liquid crystal display panel, having a first substrate on which are formed a plurality of scanning electrodes extending in a first direction, a second substrate on which are formed a plurality of data electrodes extending in a second direction different from the first direction, and a liquid crystal layer formed between the first and second substrates; a scanning electrode driving circuit which applies, to the plurality of scanning electrodes, scan pulses having combinations of different voltage levels according to whether a scanning electrode is selected or unselected; a data electrode driving circuit which applies, to the plurality of data electrodes, data pulses having combinations of different voltage levels according to write data, corresponding to the scan pulses; and a driving control circuit which supplies, to the scanning electrode driving circuit and data electrode driving circuit, pulse control signal which controls the voltage levels of the scan pulses and data pulses; wherein the scanning electrode driving circuit and data electrode driving circuit respectively control the scan pulses and data pulses at voltage levels according to the pulse control signal, and the driving control circuit inverts or does not invert the phase of the pulse control signal, at each application interval of the scan pulses, according to a relation between the number of changed values and the number of unchanged values of the write data.

The object and advantages of the invention will be realized and attained by means of the elements and combinations particularly pointed out in the claims.

It is to be understood that both the foregoing general description and the following detailed description are exemplary and explanatory and are not restrictive of the invention, as claims.

BRIEF DESCRIPTION OF DRAWINGS

FIG. 1 depicts the cross-sectional configuration of a liquid crystal display device using cholesteric liquid crystals and capable of full-color display.

FIG. 20 and FIG. 21 depict an example of pulse signals for another overwrite driving method.

DESCRIPTION OF EMBODIMENTS

Figure 2B:
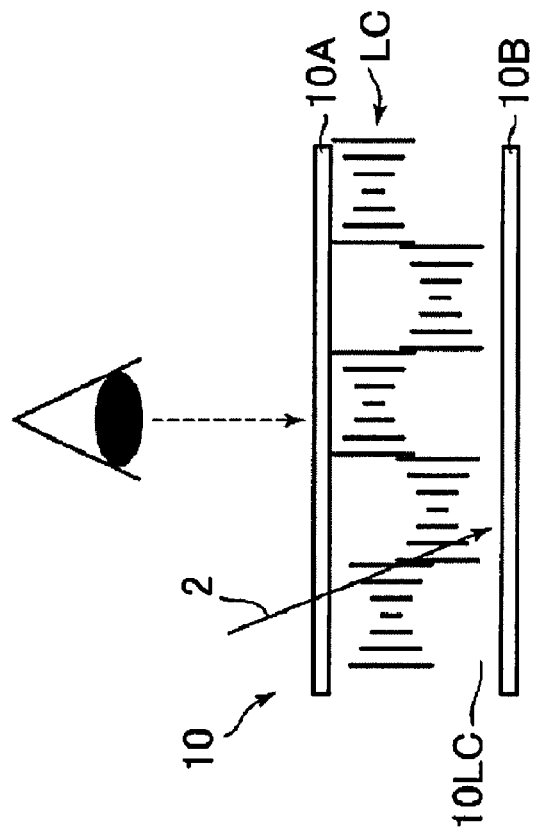
FIG. 2A and FIG. 2B depict the principle of display of liquid crystal display devices using cholesteric liquid crystals.

By means of the embodiments, the frequency of AC pulses applied to liquid crystals can be lowered, and power consumption can be reduced.

Preferred embodiments will be explained referring to the drawings.

Figure 5:
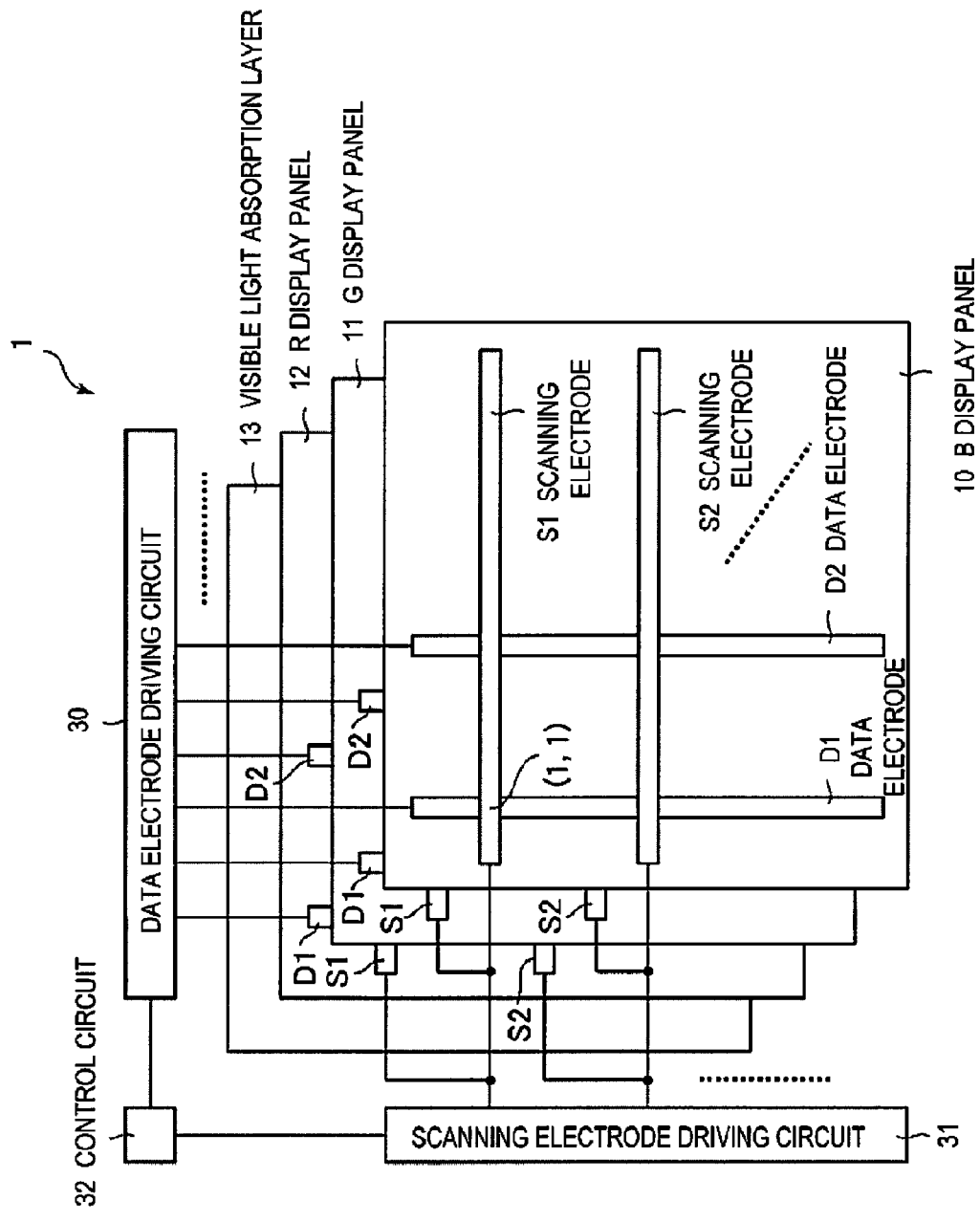
FIG. 5 depicts a schematic configuration of a liquid crystal display panel of one embodiment.

FIG. 5 depicts a schematic configuration of a liquid crystal display panel of one embodiment. As depicted in FIG. 1, a color liquid crystal display panel has layered BGR display panels 10, 11, 12 and a visible light absorption layer 13. Each of the display panels 10, 11, 12 has a plurality of scanning electrodes S1, S2 extending in the horizontal direction and a plurality of data electrodes D1, D2 extending in the vertical direction, and pixels (1,1) are formed at the positions of intersection of these electrodes. A scanning electrode driving circuit 31 provided in common for the three panels applies scan pulses to the scanning electrodes S1, S2 of each of the panels. On the other hand, a data electrode driving circuit 30 provided separately for each panel applies data pulses corresponding to write data to the data electrodes D1, D2. And, a driving control circuit 32 controls the driving of the data electrode driving circuit 30 and scanning electrode driving circuit 31.

Figure 6:
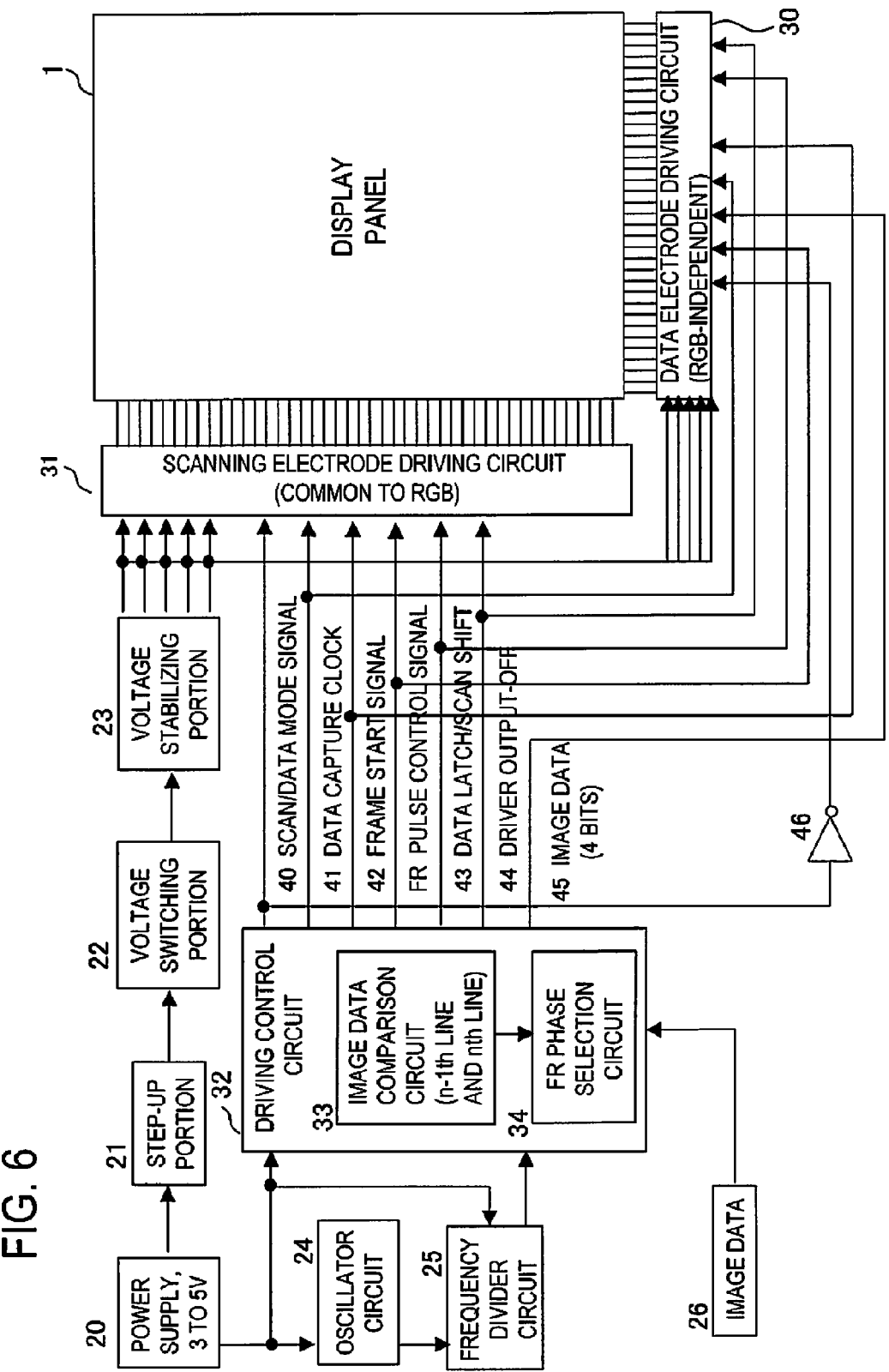
FIG. 6 depicts the configuration of a liquid crystal display panel of this embodiment.

FIG. 6 depicts the configuration of a liquid crystal display panel of this embodiment. In FIG. 6, the display panel 1 and driving unit are depicted. The driving unit has a data electrode driving circuit 30, scanning electrode driving circuit 31, driving control circuit 32, power supply unit 20, step-up portion 21 which steps up the voltage output by the power supply unit 20, voltage switching portion 22 which switches the stepped-up voltage generated by the step-up portion 21, and voltage stabilizing portion 23 which holds this voltage constant and supplies the voltage to the driving circuits 30 and 31. Further, the driving unit has an oscillator circuit 24 which generates a clock signal, and a frequency divider circuit 25 which divides the frequency of this clock signal; the frequency-divided clock signal is supplied to the driving control circuit 32. Also, image data 26 corresponding to the driving method is supplied to the driving control circuit 32, and the driving control circuit 32 supplies this image data 45 to the data electrode driving circuit 30. The scanning electrode driving circuit 31 outputs selection scan pulses to selected scanning electrodes and unselected scan pulses to unselected scanning electrodes; the data electrode driving circuit 30 outputs data pulse signals corresponding to the image data 45 to the data electrodes. The scan pulses and data pulses are both AC pulses, and the voltage difference between the two pulses is applied to the pixels.

General-use liquid crystal drivers are used for the electrode driver circuits 30, 31, and the driving control circuit 32 supplies various signals necessary for driving control to the electrode driving circuits 30, 31. That is, the various signals comprise scan/data mode signals 40, which control whether the electrode driving circuits 30, 31 drive scanning electrodes or data electrodes; data capture clock signals 41, with the timing of data capture; frame start signals 42; pulse control signals FR; data latch/scan shift signals 43, with the timing of latching image data 45 and the timing of scanning electrode scanning; and driver output-off signals 44 which turn off output of the driving circuits 30, 31.

Further, the driving control circuit 32 has an image data comparison circuit 33 which compares write data (image data) corresponding to the nth scanning electrode being scanned and to the n−1th scanning electrode being scan-ended, and a FR phase selection circuit 34 which selects the phase of the pulse control signals FR according to the comparison result. The pulse control signals FR are supplied to the electrode driving circuits 30, 31 according to the phase selected by the FR phase selection circuit 34. The electrode driving circuits 30, 31 output driving pulse signals, comprising combinations of two voltage levels corresponding to the polarity (1 or 0) of these pulse control signals FR), to their respective electrodes. That is, the driving pulse signals comprise different voltage levels, but the voltage levels are selected according to the polarity (1,0) of the pulse control signals FR. By means of the image data comparison circuit 33 and FR phase selection circuit 34, pulse control signals FR suitable for reduced power consumption are generated; this function is described in detail below.

Figure 7:
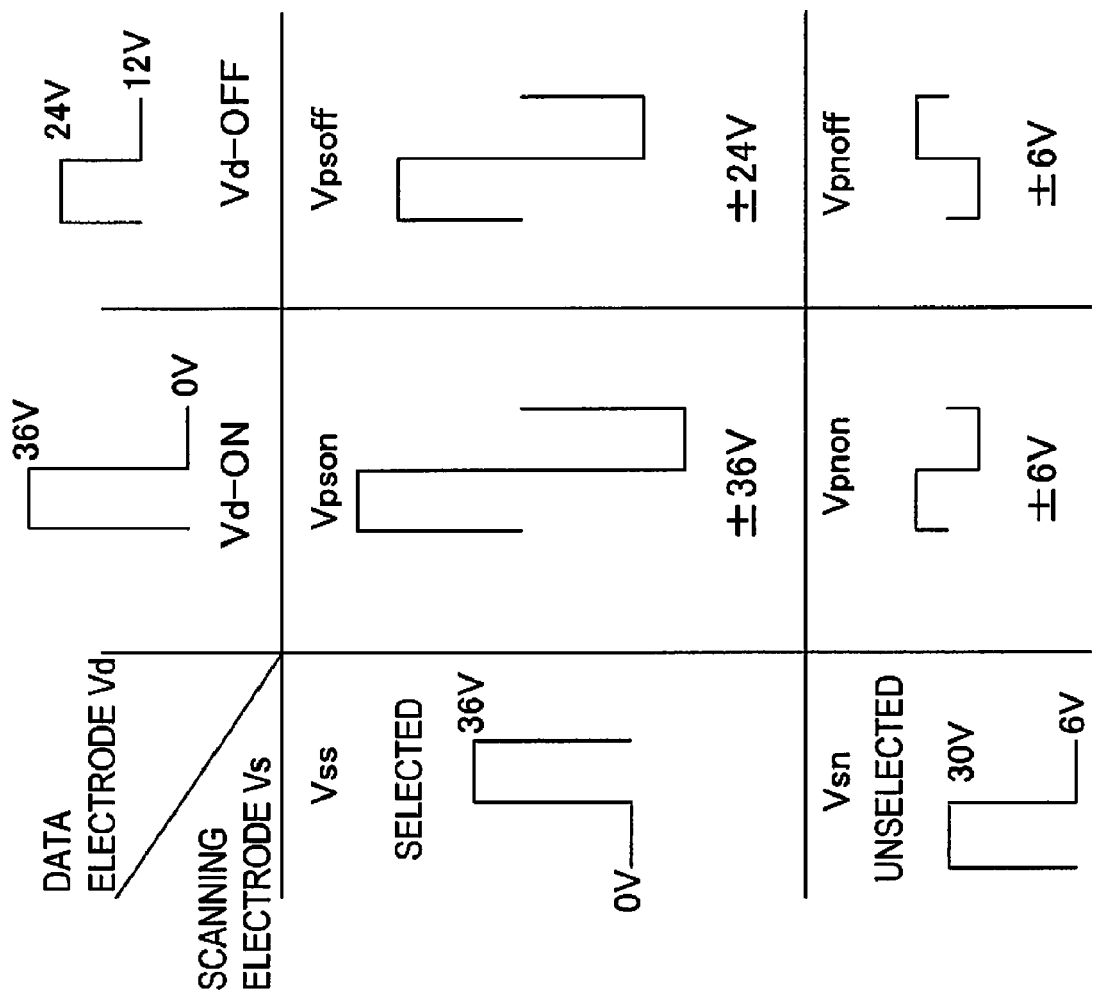
FIG. 7 and FIG. 8 depict scan pulse, data pulse, and liquid crystal application voltages in the embodiment.
Figure 8:
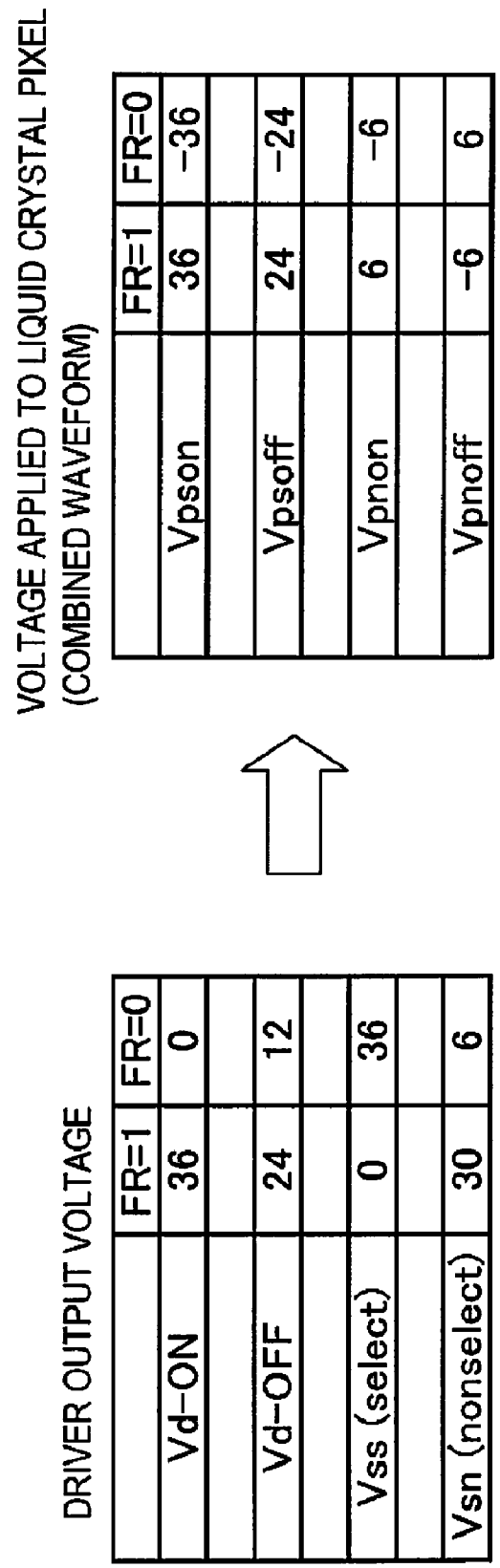

FIG. 7 and FIG. 8 depict scan pulse, data pulse, and liquid crystal application voltages in the embodiment. In FIG. 7, the scan pulses Vs applied to scanning electrodes, data pulses Vd applied to data electrodes, and combined pulses Vp applied to pixel liquid crystals, which are the pulses obtained by combining these, are depicted. FIG. 8 depicts specific voltages of pulses corresponding to pulse control signals FR.

Figure 2A:
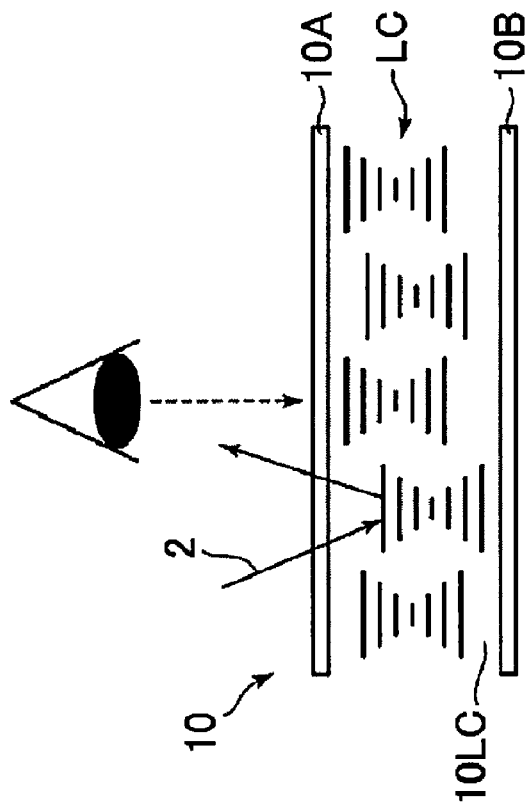

Scan pulses Vs include scan pulses Vss for selected scanning electrodes and scan pulses Vsn for unselected scanning electrodes; data pulses Vd include data pulses Vd-ON for data ON signals, and data pulses Vd-OFF for data OFF signals. The voltage which is the difference of the data pulse voltage and the scan pulse voltage is applied to the liquid crystals for each pixel. Data ON signals correspond to the voltage V1 corresponding to the homeotropic state HT in FIG. 2A and FIG. 2B when for example writing to the planar state PL or focal conic state FC, and data OFF signals correspond to application of the voltage V2 to induce the focal conic state. When writing to a grayscale, data ON corresponds to application of a strong electric field, and data OFF corresponds to application of a weak electric field.

FIG. 8 depicts scan pulses Vss, Vsn and data pulses Vd-ON, Vd-OFF when the pulse control signals FR are FR=1, 0. The selected scan pulse Vss is an AC pulse at 0 V for the first half of the scan interval and at 36 V for the second half, and the unselected scan pulse Vsn is an AC pulse at 30 V for the first half of the scan interval and at 6 V for the second half. The data ON data pulse Vd-ON is an AC pulse at 36 V for the first half of the scan interval and at 0 V for the second half, and the data OFF data pulse Vd-OFF is an AC pulse at 24 V for the first half of the scan interval and at 12 V for the second half.

Accompanying this, at pixels of selected scanning electrodes, for data ON a voltage Vpson of +36 V for the first half and −36 V for the second half is applied, and for data OFF a voltage Vpsoff of +24 V for the first half and −24 V for the second half is applied. And, at pixels of unselected scanning electrodes, for data ON a voltage Vpnon of +6 V for the first half and −6 V for the second half is applied, and for data OFF a voltage Vpnoff of −6 V for the first half and +6 V for the second half is applied. The above-described AC voltages Vpson, Vpsoff, Vpnon, Vpnoff are applied to the liquid crystals of different pixels, and so hereafter are called AC pixel pulses.

That is, a high AC pulse of ±36 V is applied to the selected scanning electrode pixels for data ON, and a low AC pulse of ±24 V is applied for data OFF. In response to these AC pulses, the pixels of the scanning electrodes are written to the planar state PL or to the focal conic state FC. On the other hand, an extremely low AC pulse of ±6 V is applied to the pixels of unselected scanning electrodes, regardless of data ON or OFF for writing to selected scanning electrode pixels, and writing so as to change the liquid crystal state is not performed.

The selected scan pulses Vss and data pulses Vd-ON, Vd-OFF have opposite phases in the first and second halves, and by this means, AC pulses comprising a positive voltage and a negative voltage are applied to the pixels of selected scanning electrodes. Unselected scan pulses Vsn have the same phase as the data pulses Vd-ON and Vd-OFF, and moreover have a voltage intermediate between the data pulses Vd-ON and Vd-OFF. By this means, an extremely low AC pulse of ±6 V is applied to the pixels of unselected scanning electrodes. A characteristic of this method is that the AC pixel pulses Vpnon and Vpnoff applied to unselected scanning electrode pixels have positive and negative polarities reversed in the first half and second half of a scan interval according to data ON and data OFF. In particular, the AC pixel pulse Vpnoff applied to data OFF pixels of unselected scanning electrodes has pulse polarity opposite that of the other AC pixels pulses Vpson, Vpsoff, Vpnon. That is, the AC pulse phases are inverted (differ by 180°).

Figure 9:
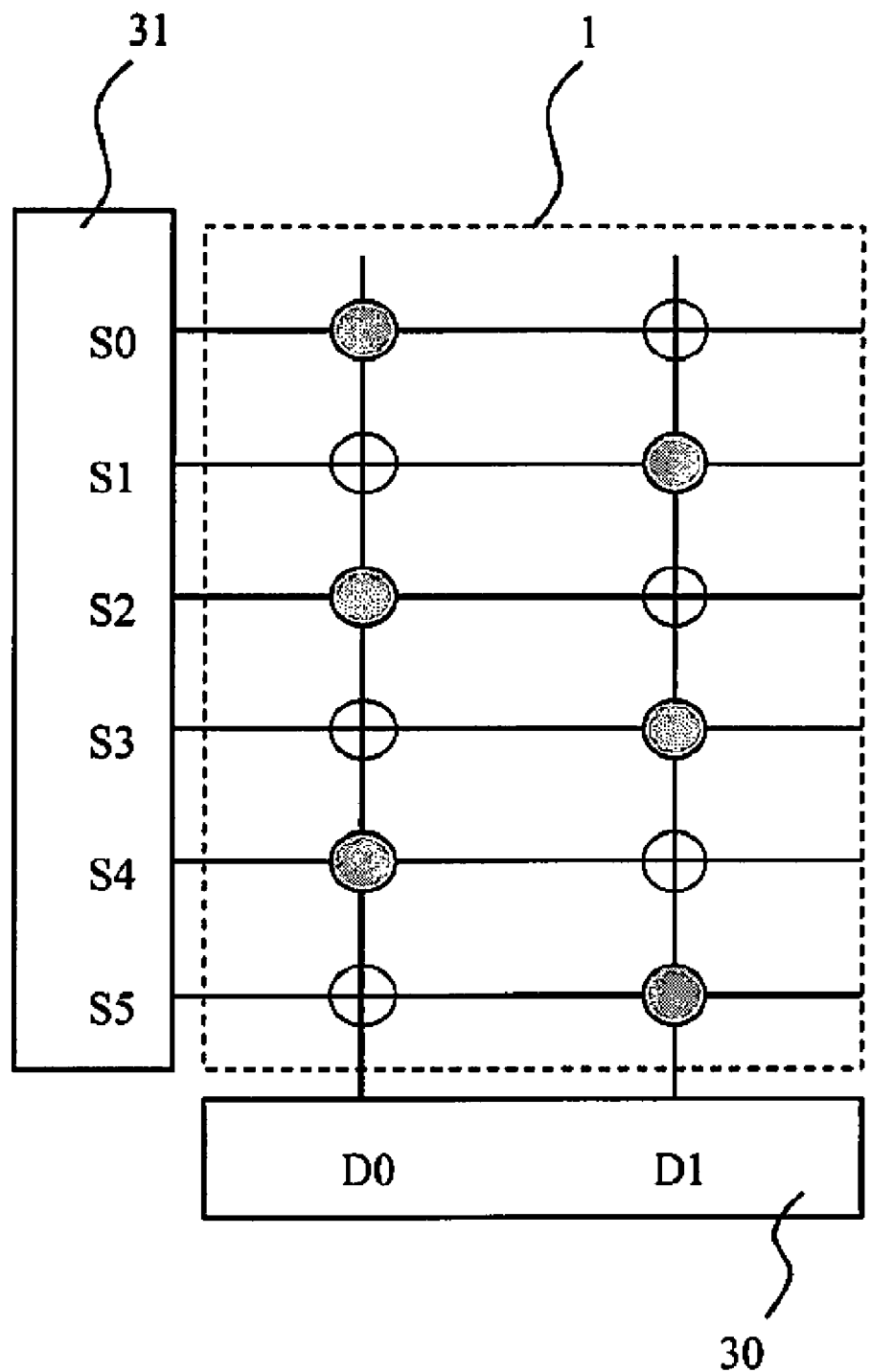
FIG. 9 depicts an example of image data for writing to a display panel.

FIG. 9 depicts an example of image data for writing to a display panel. The display panel 1 is provided with scanning electrodes S0 to S5 and data electrodes D0, D1, and in the example of FIG. 9, black (focal conic state FC) and white (planar state PL) are written to the pixels at the different intersection positions.

Figure 10:
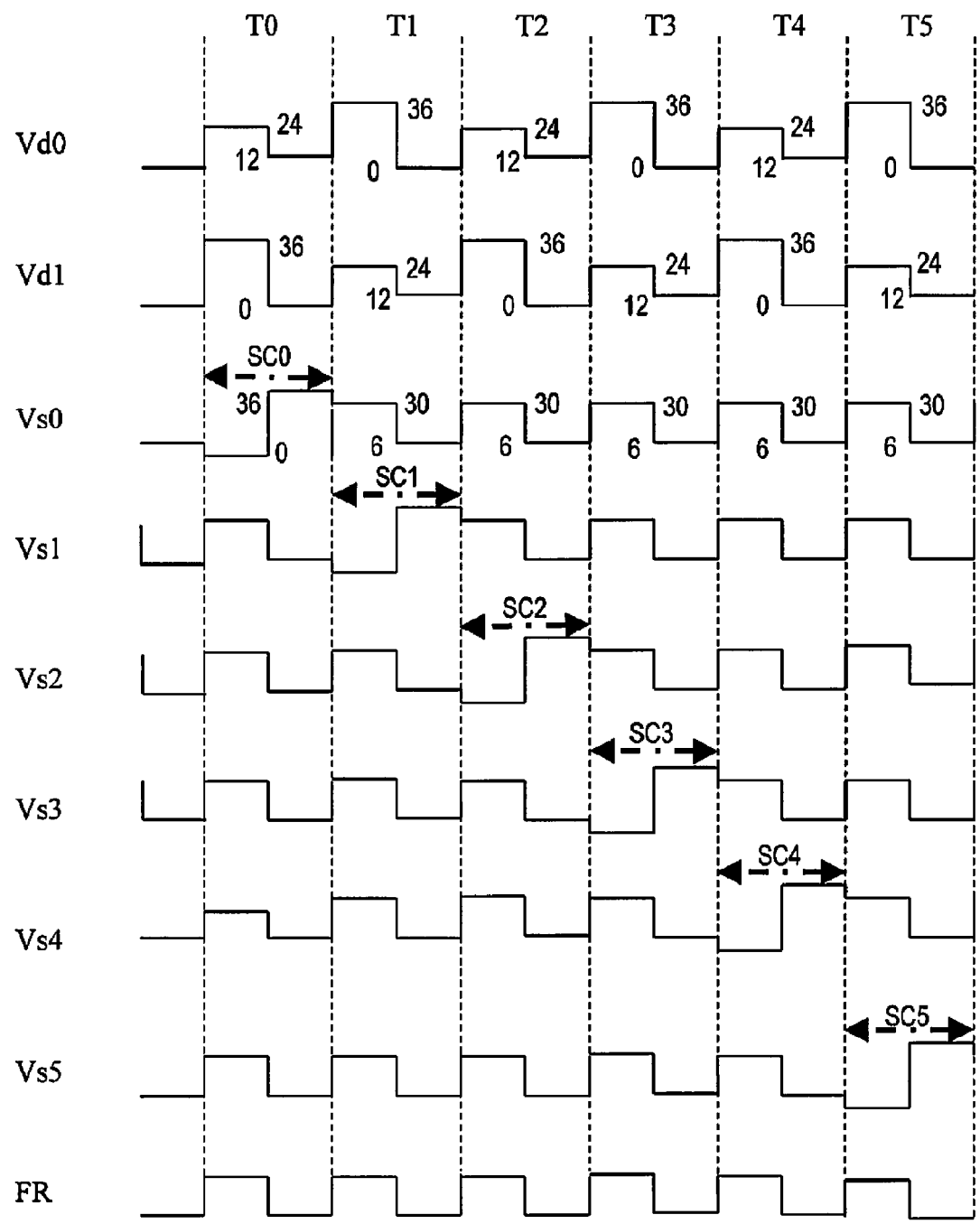
FIG. 10 depicts an example of driving pulses in FIG. 9.

FIG. 10 depicts an example of driving pulses in FIG. 9. In FIG. 10, the data pulses Vd0, Vd1 of the data electrode driving circuit 30, the scan pulses Vs0 to Vs5 of the scanning electrode driving circuit 31, and the pulse control signals FR are depicted.

FIG. 10 is an example in which the pulse control signals FR are FR=1 in the first half of the scan interval and are FR=0 in the second half, and the phase of the pulse control signals FR is not inverted at each scan interval. In the scan interval T0 the scanning electrode S0 is selected, the scan pulse is 0 V in the first half and 36 V in the second half of the selection interval SC0, and the data pulses Vd0, Vd1 are set to 24 V and 12 V for Vd0 corresponding to the focal conic state and to 36 V and 0 V for Vd1 corresponding to the planar state. As a result, an AC pixel pulse with a low peak value of ±24 V and an AC pixel pulse with a high peak value of ±36 V, corresponding to data OFF and data ON, are applied to pixels of the selected scanning electrode S0 in the scan interval T0.

Next, the scanning electrode S1 is selected in the scan interval T1, and during this selection interval SC1 the scan pulse is 0 V in the first half and 36 V in the second half, while the data pulse Vd0 is 36 V and 0 V corresponding to the planar state, and the data pulse Vd1 is 24 V and 12 V corresponding to the focal conic state. As a result, in the scan interval T1, high ±36 V AC pixel pulses and low ±24 V AC pixel pulses corresponding to data ON and data OFF respectively are applied to pixels of the selected scanning electrode S1.

Scan pulses and data pulses are similarly applied in the scan intervals T2 to T5, and AC pixel pulses at high ±36 V and low ±24 V, corresponding to data ON and data OFF, are applied to the pixels of each selected scanning electrode.

Figure 11:
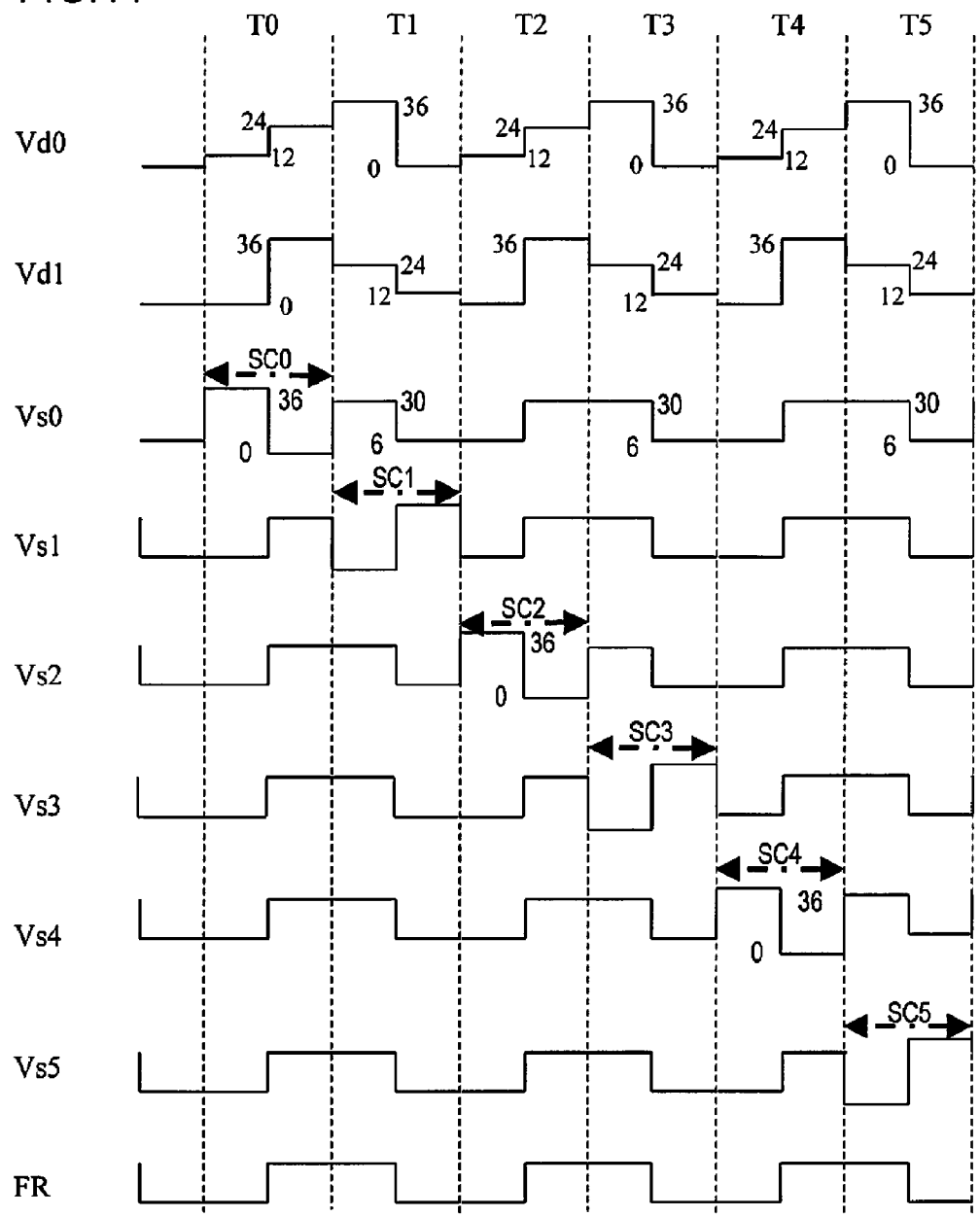
FIG. 11 depicts another example of the driving pulses in FIG. 9.

FIG. 11 depicts another example of the driving pulses in FIG. 9. In FIG. 11 also, the data pulses Vd0, Vd1 of the data electrode driving circuit 30, the scan pulses Vs0 to Vs5 of the scanning electrode driving circuit 31, and the pulse control signals FR are depicted.

FIG. 11 is an example in which in the first halves of the scan intervals T1, T3, T5, the pulse control signals FR are FR=1, and in the second halves FR=0, while in the first halves of the scan intervals T0, T2, T4, FR=0, and in the second halves FR=1, so that the phase of the pulse control signals FR is inverted 180° at each scan interval. Accompanying this, the polarities of scan pulses Vs and data pulses Vd0, 1 (voltage level combinations) in the scan intervals T0, T2, T4 with pulse control signals FR=0,1 are opposite the polarities (voltage level combinations) of the same pulses in the scan intervals T1, T3, T5 with pulse control signals FR=1,0.

In other words, in the scan interval T0 the scanning electrode S0 is selected, and during this selection SC0 the scan pulse is 36 V in the first half and 0 V in the second half, and Vd0 corresponding to the focal conic state is 12 V, 24 V, while Vd1 corresponding to the planar state is 0 V, 36 V. As a result, in the scan interval T0, low-voltage ±24 V AC pixel pulses and high-voltage ±36 V AC pixel pulses, corresponding to data OFF and data ON, are applied to pixels of the selected scan electrode S0.

Next, in the scan interval T1 the scanning electrode S1 is selected, during the selection interval SC1 the scan pulse is 0 V in the first half and 36 V in the second half, the data pulse Vd0 corresponding to the planar state is set to 36 V and 0 V, and the data pulse Vd1 corresponding to the focal conic state is set to 24 V and 12 V. As a result, in the scan interval T1, AC pixel pulses at a high voltage of ±36 V and AC pixel pulses at a low voltage of ±24 V, corresponding to data ON and data OFF, are applied to the pixels of the selected scanning electrode S1.

Similarly, in the scan intervals T2 and T4, scan pulses and data pulses similar to those in the scan interval T0 are applied, and in the scan intervals T3 and T5, scan pulses and data pulses similar to those in the scan interval T1 are applied, and AC pixels pulses at high and low voltages of ±36 V and ±24 V corresponding to data ON and data OFF are applied to the pixels of each of the selected scanning electrodes.

As described above, by appropriately controlling the pulse control signal FR, the polarities of scan pulses and data pulses (the combination of voltage levels) in the first half and second half of the scan interval can be controlled to obtain polarities (1,0) corresponding to the pulse control signal FR.

Here, AC pixel pulses applied to pixels are explained for cases in which FR=1,0 is continued without inverting the phase of the pulse control signals FR, as in FIG. 10, and for cases in which the phase of the pulse control signals FR is inverted to alternate between FR=0,1 and FR=1,0, as in FIG. 11 according to write display data.

Figure 12:
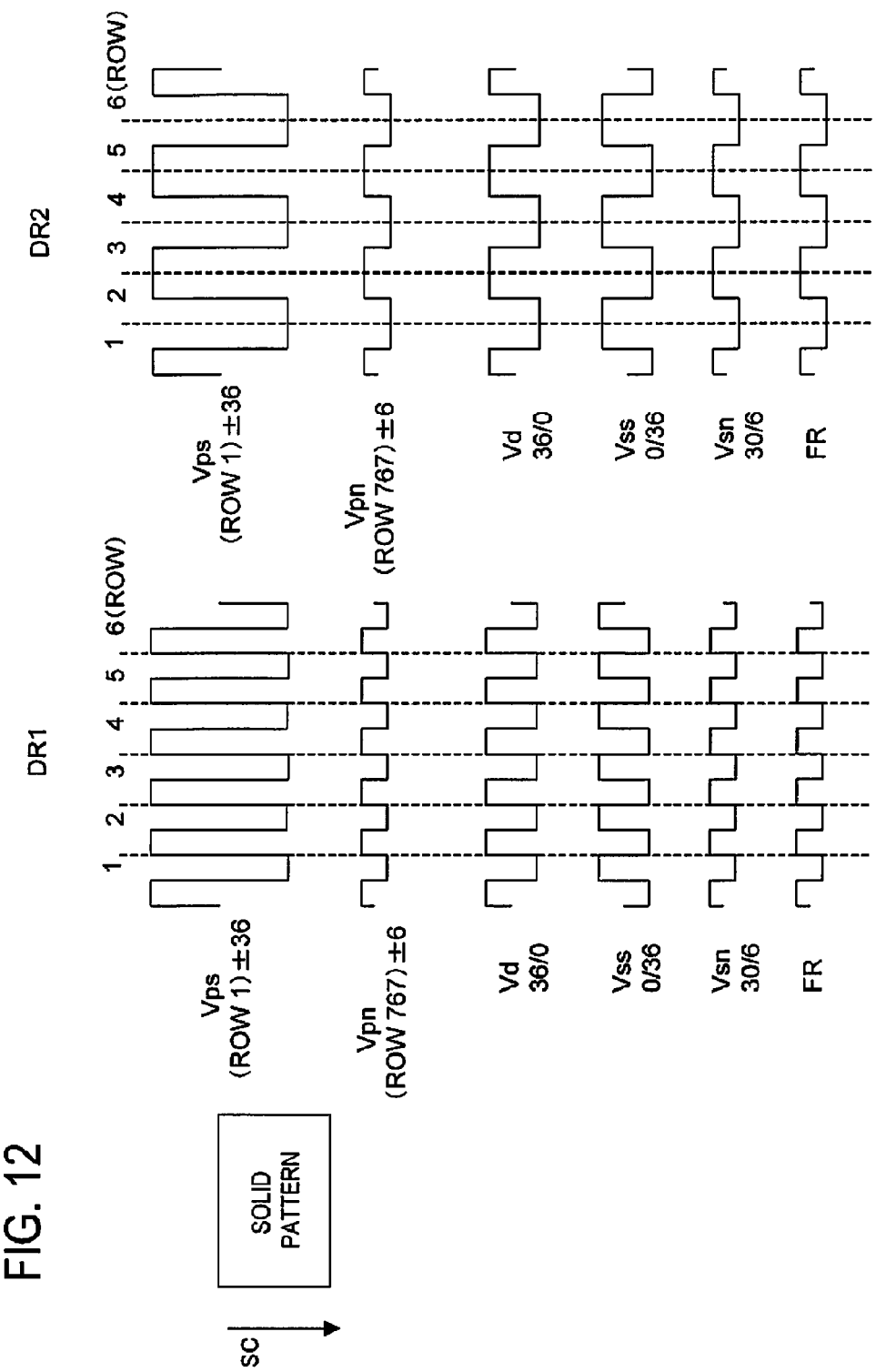
FIG. 12 depicts a driving method for cases in which the image is a solid pattern.

FIG. 12 depicts a driving method for cases in which the image is a solid pattern. FIG. 12 depicts, for image data in an all-white pattern, a case of a driving method DR1 in which the phase of the pulse control signals FR is not inverted and FR=1,0 is repeated, and a case of a driving method DR2 in which the phase of FR is inverted to alternate between FR=0,1 and FR=1,0. The data pulses Vd, selected scan pulses Vss, unselected scan pulses Vsn, AC pixel pulses Vps applied to the liquid crystals of selected scanning electrodes, and AC pixel pulses Vpn applied to the liquid crystals of unselected scanning electrodes, are depicted for each of the driving methods DR1 and DR2. For a solid pattern, there is no change in the 36/0 V voltages of data pulses Vd even when moving in the scanning direction SC.

In the driving method DR1, the pulse control signals FR=1,0 are repeated in each scan interval, so that the data pulses Vd corresponding to the all-white image data are also a repeated alternation of 36 V and 0 V. The selected scan pulses Vss are repeatedly 0 V and 36 V, and the unselected scan pulses Vsn are repeatedly 30 V and 6 V. As a result, the selected scanning electrode AC pixel pulses Vps are repeatedly +36 V and −36 V, and the unselected scanning electrode AC pixel pulses Vpn are repeatedly +6 V and −6 V, and all of the AC pixel pulses Vps, Vpn have the same polarity as the pulse control signals FR. As a result, the AC pixel pulses Vps, Vpn all have the same frequency as the pulse control signals FR, and liquid crystals are subjected to charge/discharge driving twice in each scan interval.

On the other hand, in the driving method DR2, the pulse control signals FR are inverted in phase in each scan interval to alternate between FR=1,0 and FR=0,1, the phase of the selected scan pulses Vss is opposite that of the pulse control signals FR, and the data pulses Vd, unselected scan pulses Vsn, and all AC pixel pulses Vps, Vpn have the same polarity as the pulse control signals FR. As a result, the AC pixel pulses Vps, Vpn both have the same frequency as the pulse control signals FR, and liquid crystals are subjected to charge/discharge driving once in each scan interval. That is, in the driving method DR2 the frequency of the AC pixel pulses is one-half the frequency in the driving method DR1, and as a result power consumption is reduced by half.

The above relationship is the same for the case in which an all-black pattern is written. However, in the driving method DR2 the reduction by half in the power consumption occurs when writing image data in a solid pattern; as explained below, when writing image data in a checkerboard pattern, there is not necessarily a reduction by half in the power consumption.

Figure 13:
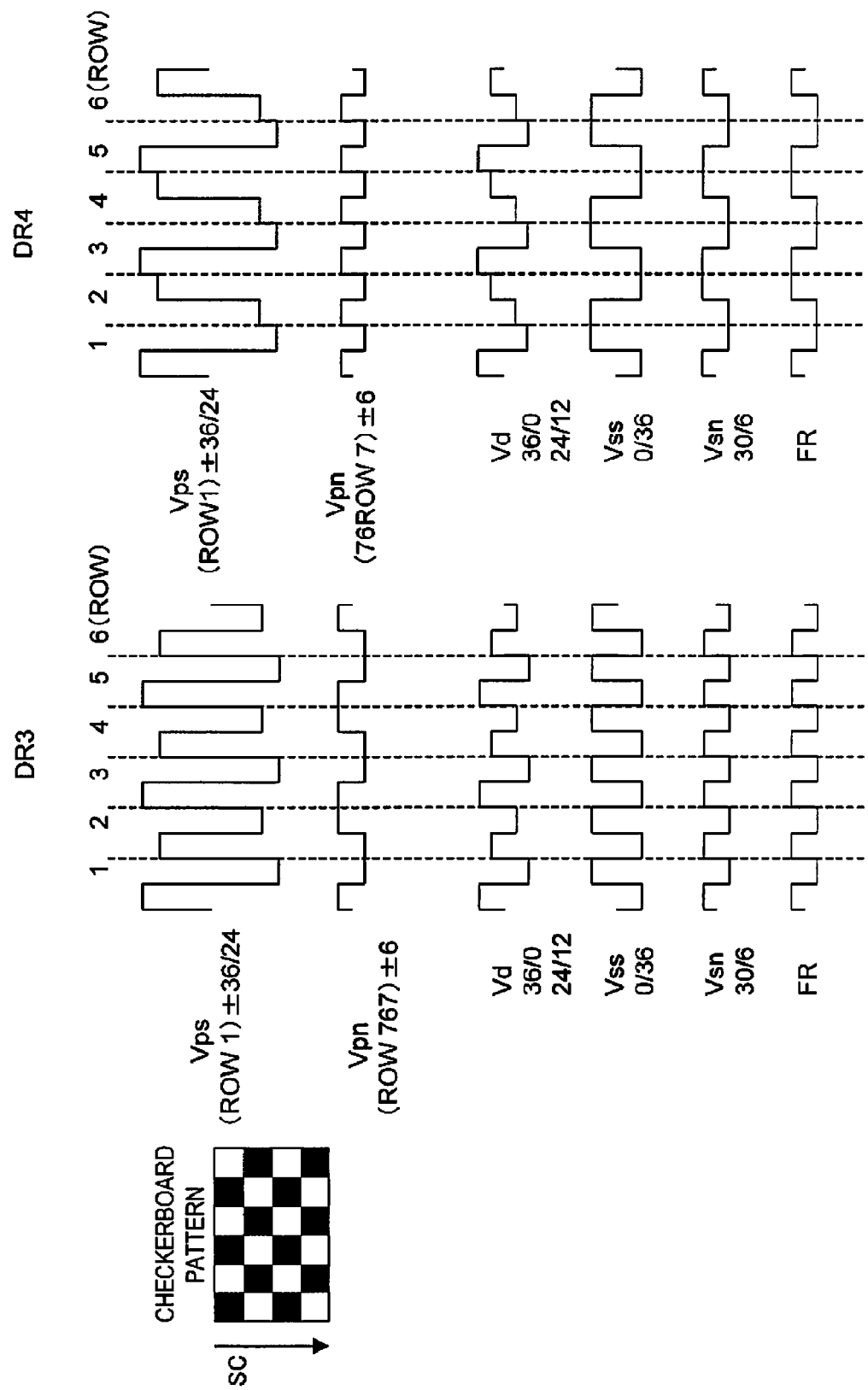
FIG. 13 depicts a driving method for a case in which the image is a checkerboard pattern.

FIG. 13 depicts a driving method for a case in which the image is a checkerboard pattern. In FIG. 13 also, a driving method DR3 in which the phase of the pulse control signals FR is not inverted and FR=1,0 is repeated, and a driving method DR4 in which the phase is inverted and FR=0,1 and FR=1,0 are alternated, are depicted. When the write image data is a checkerboard pattern, focusing on a certain data pulse Vd, the combination of pulse voltage levels alternates between 36/0 V and 24/6 V. In particular, the data pulse Vd corresponding to the focal conic state FC (black) is 24/12 V, and the upper/lower voltage relation of 30/6 V for unselected scan pulses Vsn is opposite to the relation for selected scan pulses Vss=36/0 V.

Hence in the case of the driving method DR3, although the selected scanning electrode AC pixel pulses Vps are of the same polarity as the pulse control signals FR, the unselected scanning electrode AC pixel pulses Vpn are of polarity opposite the pulse control signals FR. That is, the selected scanning electrode AC pixel pulses Vps are pulses at the same frequency as the pulse control signals FR, but the unselected scanning electrode AC pixel pulses Vpn are at a low frequency which is ½ the frequency of the pulse control signals FR.

On the other hand, in the driving method DR4, the selected scanning electrode AC pixel pulses Vps are at the same low frequency as the pulse control signals FR, but the unselected scanning electrode AC pixel pulses Vpn are high frequency pulses, having a frequency twice that of the pulse control signals FR.

Upon comparing the above driving methods DR1 to DR4, in cases in which a solid pattern is written, the driving method DR2 in which the pulse control signals FR are switched is effective for reducing power consumption; however in the case of checkerboard pattern writing, the driving method DR2 is effective for reducing power consumption to selected scanning electrode liquid crystals, but the driving method DR1 is effective for reducing power consumption to unselected scanning electrode liquid crystals. In a general example of an A4-size display panel, there are 768 scanning electrodes, of which one scanning electrode is in the selected state, and the other 767 scanning electrodes are in the unselected state. Hence it is seen that the driving method most effective for reducing power consumption for the panel overall would entail selecting the driving method DR2 for solid pattern writing, and selecting the driving method DR3 for checkerboard pattern writing. However, stated more strictly, in addition to the relation between the number of selected scanning electrodes to the number of unselected scanning electrodes, the result also depends on the relation between the voltage applied to selected scanning electrodes and the voltage applied to unselected scanning electrodes. This is discussed in further detail below.

Figure 14:
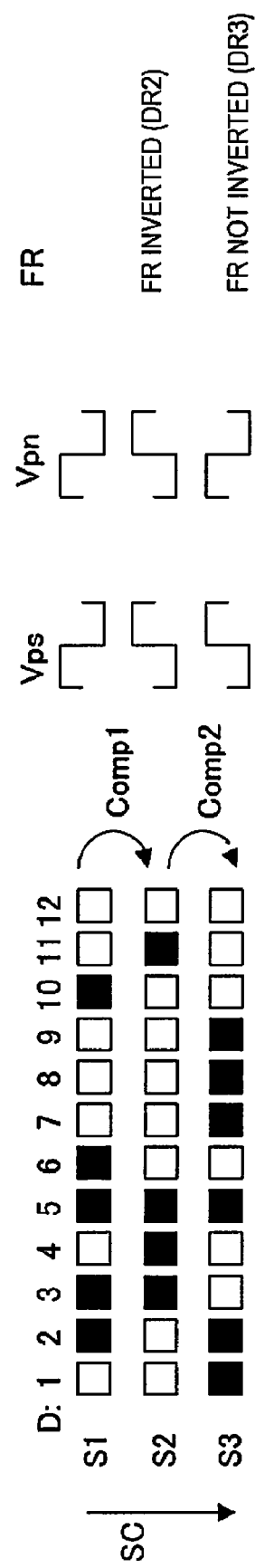
FIG. 14 is a conceptual diagram of this embodiment.

FIG. 14 is a conceptual diagram of this embodiment. In the figure, write data D1 to D12 at the sequentially selected scanning electrodes S1, S2, S3 corresponding to the scanning direction SC is indicated by white and black. In this embodiment, each time the selected scanning electrode changes from S1 to S2, or from S2 to S3, the number of inversions and the number of non-inversions of the write data D1 to D12 are compared, and if the number of non-inversions is greater, the phase of the pulse control signals FR is inverted (with phase inverted 180° from FR=0,1 to FR=1,0, or phase inverted from FR=1,0 to FR=0,1) to apply the driving method D2 of FIG. 12, and if the number of inversions of write data is greater, the phase of the pulse control signals FR is not inverted (non-inversion), to apply the driving method DR3 of FIG. 13.

Upon application to the example of FIG. 14, when the scan interval for writing shifts from the scanning electrode S1 to the scanning electrode S2, the write data for the scanning electrodes S1 and S2 are compared. As a result, the number of pixels for which write data does not change and the number of pixels for which write data does change are as 7:5. Hence if the driving methods DR1 or DR3 are adopted, in which the phase of the pulse control signals FR is not inverted upon each scan, then at the time of scan interval switching, the number of pixels for which the liquid crystal application voltage Vpn for the unselected scanning electrode changes as DR1, and the number of pixels for which there is no change as DR3, are as 7:5. On the other hand, if the driving methods DR2 or DR4 are adopted, in which the phase of the pulse control signals FR is inverted at each scan, then at the time of scan interval switching, the number of pixels for which the liquid crystal application voltage Vpn for the unselected scanning electrode changes as DR4, and the number of pixels for which there is no change as DR2, are as 5:7. As a result, when the scan interval shifts from the scanning electrode S1 to the scanning electrode S2, adoption of the driving method DR2 or DR4, in which the phase of the pulse control signals FR is inverted, results in fewer changes in the unselected scanning electrode liquid crystal application voltage Vpn, and power consumption can be further suppressed.

Next, when the scan interval shifts from the scanning electrode S2 to the scanning electrode S3 to perform writing, the write data for scanning electrodes S2 and S3 are compared. As a result, the number of pixels for which write data does not change and the number of pixels for which write data does change are as 4:8. Hence if the driving methods DR1 or DR3 are adopted, in which the phase of the pulse control signals FR is not inverted upon each scan, then at the time of scan interval switching, the number of pixels for which the liquid crystal application voltage Vpn for the unselected scanning electrode changes as DR1, and the number of pixels for which there is no change as DR 3, are as 4:8. On the other hand, if the driving methods DR2 or DR4 are adopted, in which the phase of the pulse control signals FR is inverted at each scan, then at the time of scan interval switching, the number of pixels for which the liquid crystal application voltage Vpn for the unselected scanning electrode changes as DR4, and the number of pixels for which there is no change as DR2, are as 8:4. As a result, when the scan interval shifts from the scanning electrode S2 to the scanning electrode S3, adoption of the driving method DR1 or DR3, in which the phase of the pulse control signals FR is not inverted, results in fewer changes in the unselected scanning electrode liquid crystal application voltage Vpn, and power consumption can be further suppressed.

As explained above, for the image data example of FIG. 14, if when the scanning electrode S1 is selected the pulse control signals FR are selected such that FR=1,0 in the first and second halves of the scan interval, then when the scanning electrode S2 is selected, the phase (or polarity) of the pulse control signals FR is inverted so that FR=0,1, and when the scanning electrode S3 is selected, the phase (or polarity) of the pulse control signals FR is not inverted, so that FR=0,1.

Further, although not depicted, when, upon shifting the selected scanning electrode, the number of pixels for which the image data is maintained and the number of pixels for which the image data changes are substantially the same, power consumption is the same for the unselected scanning electrode liquid crystal application voltage Vpn whether the phase of the pulse control signals FR is inverted or not inverted. However, because the selected scanning electrode AC pixel pulses Vps have the same polarity as the pulse control signals FR regardless of the image data, power consumption can be more effectively suppressed using the driving methods DR2 and DR4, in which the phase of the pulse control signals FR is inverted. Hence if the number of pixels for which the image data changes and the number of pixels for which there is no change at the time of scan interval shifting are approximately the same, by inverting the phase of the pulse control signals FR, power consumption can be further suppressed.

Here, the meaning of that the number of pixels for which the image data is maintained and the number of pixels for which the image data is changed are approximately the same, is as follows. The power consumption due to the unselected scanning electrode AC pixel pulses Vpn is lower for a driving method in which the phase of the pulse control signals FR is not inverted if the number of pixels for which the image data changes P1 is greater than the number of pixels for which the image data does not change P2, whereas if P1 is smaller than P2, power consumption is lower when a driving method in which the FR phase is inverted is used. On the other hand, the power consumption due to the selected scanning electrode AC pixel pulses Vps is lower for a driving method in which the FR phase is inverted, regardless of the result of comparison of P1 and P2.

Hence if the number of pixels P1 is greater than the number P2 by a number dP, which corresponds to the difference in power consumption of the selected scanning electrode AC pixel pulses Vps between for driving methods which invert the FR phase and for driving methods which do not invert the FR phase, then it is desirable that a driving method DR1 or DR3 in which the FR phase is not inverted be adopted, and if the number of pixels P1 is not greater than P2 by the amount dP or more, then it is desirable that a driving method DR2 or DR4 in which the FR phase is inverted be adopted. That is, upon comparing the number of pixels for which the image data changes P1 with the number of pixels for which the image data does not change P2, the following driving methods can further reduce power consumption.

TABLE 1

P1 >> P2: Driving methods DR1, DR3 in which the FR phase is not inverted for each scan interval
P1-dP ≧ P2: Driving methods DR1, DR3 in which the FR phase is not inverted for each scan interval
P1-dP < P2: Driving methods DR2, DR4 in which the FR phase is inverted for each scan interval
P1 << P2: Driving methods DR2, DR4 in which the FR phase is inverted for each scan interval The above dP fluctuates in the range 16 to 36 depending on the image data.

Upon considering the size of a display panel relying on similar reasoning, if the display panel size is comparatively large, and the number of unselected scanning electrodes NS is enough large compared with the number of selected scanning electrodes SS, then power consumption by the unselected scanning electrodes is dominant, so that as explained above, it is preferable that a decision as to whether or not to invert the phase of the pulse phase control signals FR be made according to the result of comparison of the number of pixels for which the image data changes P1 with the number of pixels for which the image data does not change P2 at the time of scan interval shifting.

However, if the display panel size is comparatively small, or if, due to a special driving method, the number of unselected scanning electrodes NS is not so large compared with the number of selected scanning electrodes SS, then power consumption by the unselected scanning electrodes is not dominant, and a driving method is preferable in which the phase of the pulse phase control signals FR is inverted, enabling suppression of power consumption.

The selected scanning electrode AC pixel pulses Vps are ±36 V or ±24 V in the examples of FIG. 7, FIG. 8, FIG. 12, and FIG. 13; on the other hand, the unselected scanning electrode AC pixel pulses Vpn are ±6 V. Hence, focusing on individual pixels, the voltage ratio is 6:1 or 4:1, and the power consumption ratio is 36:1 or 16:1. Assuming a comparatively low power consumption ratio of 16:1, it is preferable that the following borderline be employed for the driving method, according to the relation between the number of selected scanning electrodes SS and the number of unselected scanning electrodes NS.

TABLE 2

SS << NS: Based on the result of comparison of the number of pixels for which the image data changes P1 with the number of pixels which do not change P2, the phase inversion or non-inversion of pulse phase control signals FR is controlled using the logic of FIG. 14.
16SS ≦ NS: Same as above
16SS > NS: Driving method DR2 or DR4 in which the phase of pulse phase control signals FR is inverted at each scan interval If the selected scanning electrode AC pixel pulse Vps and unselected scanning electrode AC pixel pulse Vpn are as V1:V2, then the energy ratio is $V1^2:V2^2$. Hence the above Table 1 and Table 2 are as follows.

TABLE 1

P1-dP ≧ P2: Driving methods DR1, DR3 in which the FR phase is not inverted for each scan interval
P1-dP < P2: Driving methods DR2, DR4 in which the FR phase is inverted for each scan interval

TABLE 2

Figure 15:
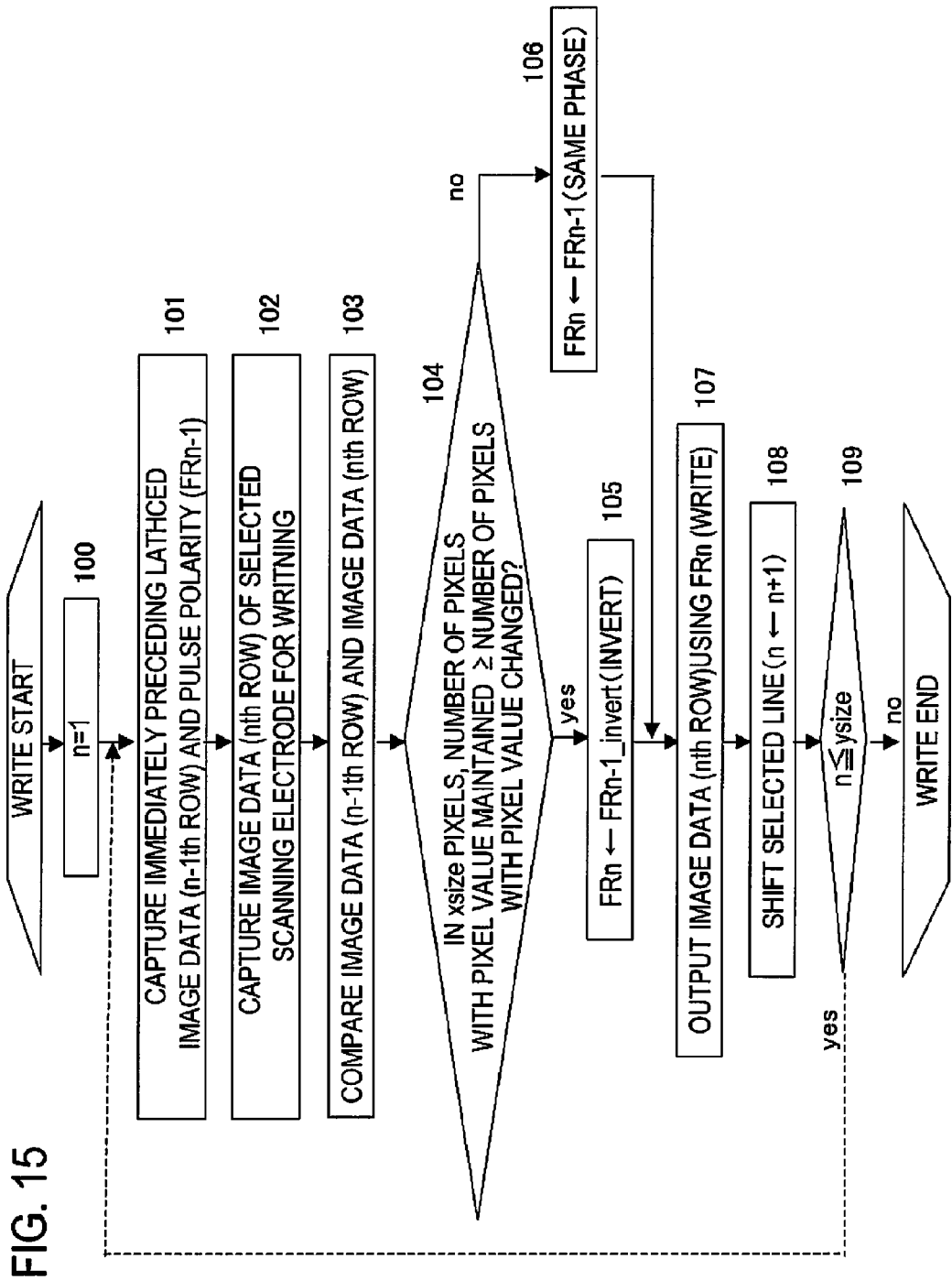
FIG. 15 is a flowchart of write control in the driving control circuit of this embodiment.

SS × $(V1/V2)^2$ ≦ NS: Phase inversion or non-inversion of FR at each scan interval is controlled according to result of comparison of P1 and P2
SS × $(V1/V2)^2$ > NS: FR phase inverted at each scan interval FIG. 15 is a flowchart of write control in the driving control circuit of this embodiment. As a premise of this flowchart, the driving control circuit 32 (FIG. 6) performs driving control in which scanning electrodes are selected sequentially and data pulses corresponding to image data are applied, as depicted in FIG. 10 and FIG. 11. The display panel size is assumed to be xsize pixels in the horizontal direction (the number of data electrodes) and ysize pixels in the vertical direction (the number of scanning electrodes), and a case is explained in which write control for one frame is performed.

First, as the initial value n=1 is set (100), and then the image data latched immediately before by the data electrode driving circuit 30 and pulse control signal FRn−1 are captured (101). Then, the image data for the selected scan electrode to perform writing is captured (102), and the two image data sets are compared (103). This comparison of image data is performed by the image data comparison circuit 33 in FIG. 6.

Then, if the comparison result indicates that, among the number of pixels xsize, the number of pixels for which the image data does not change is equal to or greater than the number of pixels which do change (YES in 104), the pulse control signal FRn is set to the inverted signal of FRn−1 (105), but if the number of pixels for which the image data does not change is less than the number of pixels which do change (NO in 104), the pulse control signal FRn is set to a signal with the same phase as FRn−1 (106). As explained above, it is desirable that the difference in the number of pixels in process 104 conform to Table 1. Processes 104, 105, 106 are performed by the FR phase selection circuit 34.

Then, the driving control circuit 32 supplies the selected pulse control signal FRn to the electrode driving circuits 30, 31, and supplies the image data for writing 45 to the data electrode driving circuit 30 (107). And, the selected scanning electrode number n is incremented by 1 (108). So long as this selected scanning electrode number n satisfies n≦ysize, the processes 101 to 108 are repeated. When writing to all selected scanning electrodes has ended, write control for one frame ends.

(Multi-Grayscale Display Driving)

In FIG. 10 and FIG. 11, examples of write control for monochrome images were explained in which each pixel is put into the planar state PL or the focal conic state FC. Next, a case is explained in which this embodiment is applied to multi-grayscale display driving.

In the case of a liquid crystal display panel device using cholesteric liquid crystals employed in electronic paper, each pixel can be made to display grayscales by means of an overwrite driving method in which writing is repeated a number of times according to the grayscale value, utilizing the cumulative responsiveness of liquid crystals, as well as by a pulse modulation driving method in which the width of the applied pulse is varied according to the grayscale value.

Figure 3:
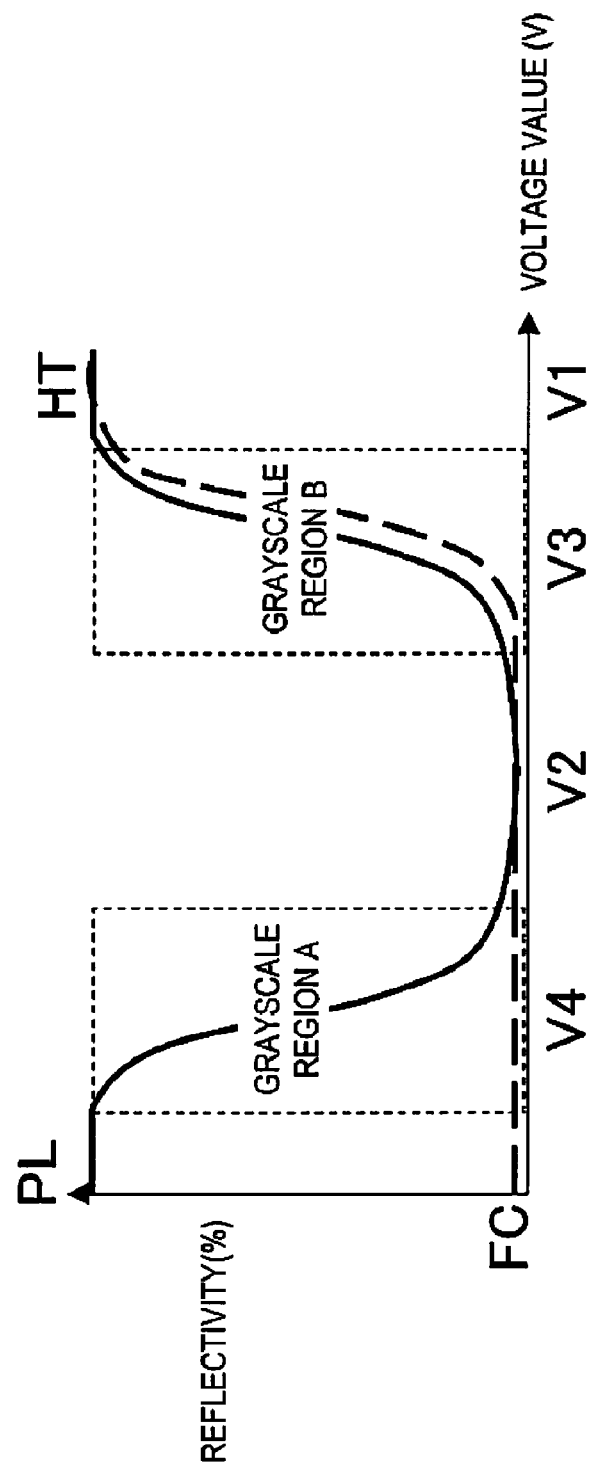
FIG. 3 depicts reflectivity characteristics versus driving voltage for cholesteric liquid crystals.
Figure 4:
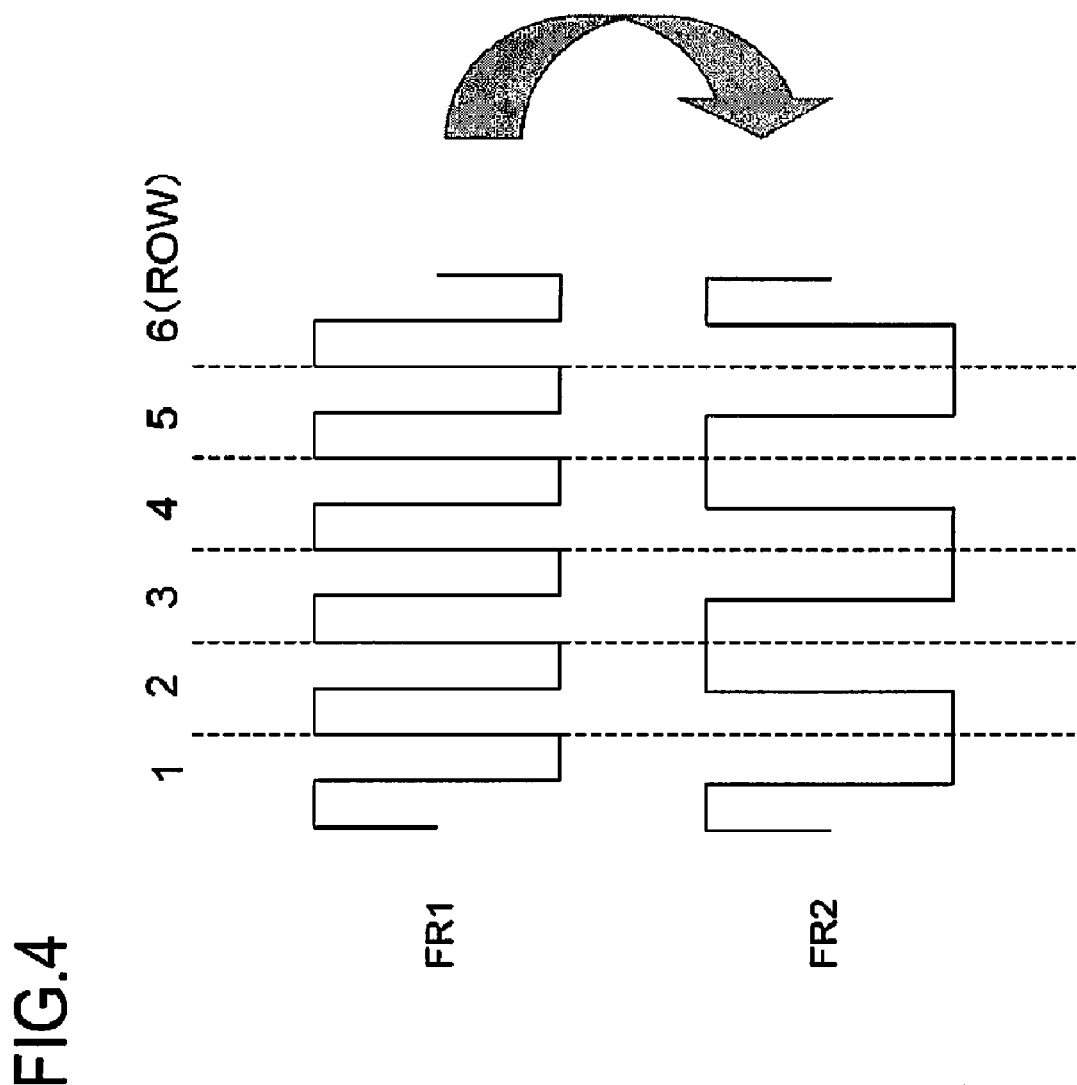
FIG. 4 depicts pulse control signals which control the polarity of driving pulses described in Patent Reference 1.
Figure 16:
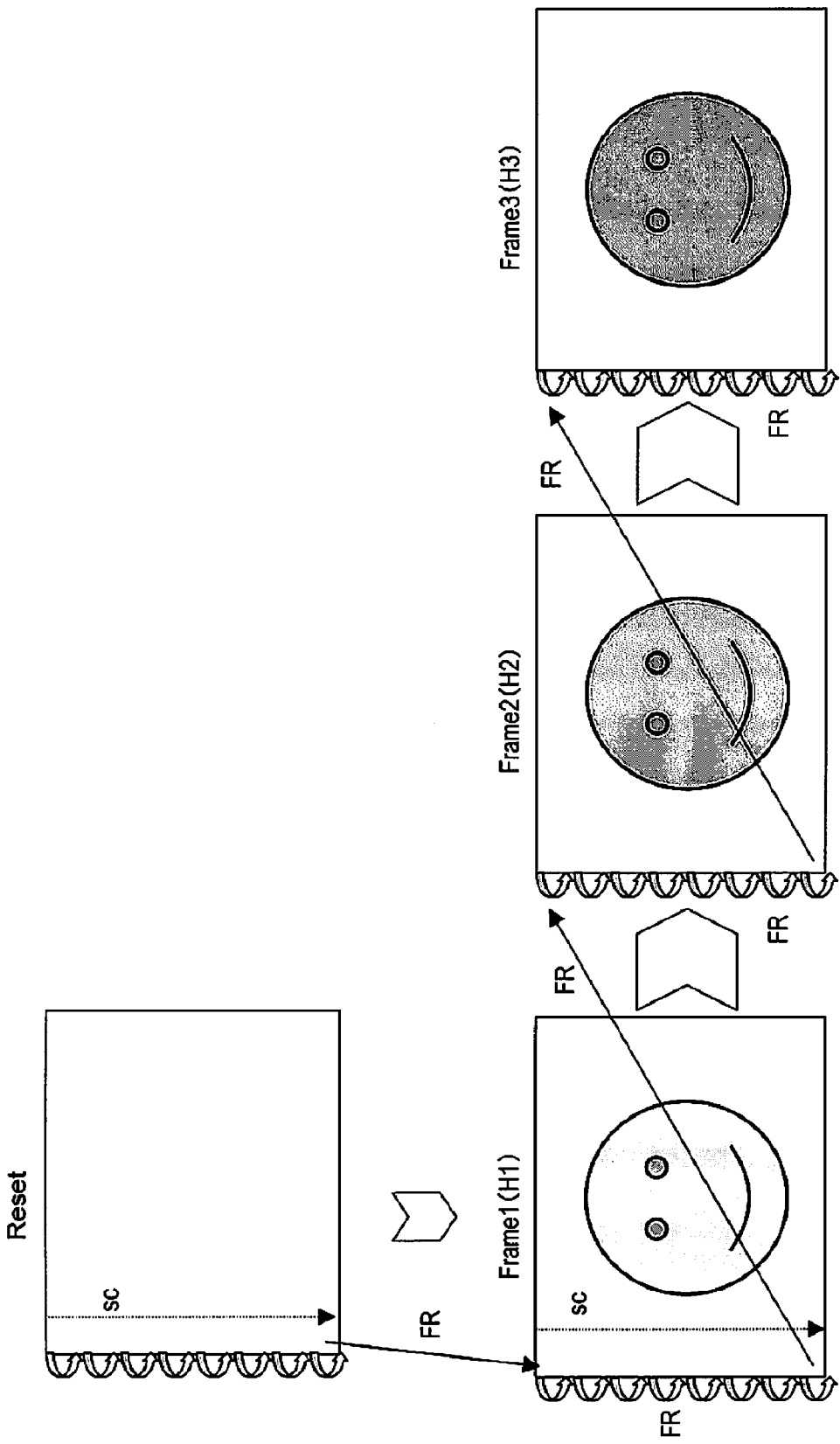
FIG. 16 explains multi-grayscale display driving using an overwrite driving method.

FIG. 16 explains multi-grayscale display driving using an overwrite driving method. In the overwrite driving method, the liquid crystal state is driven corresponding to the grayscale value of the image data by means of a plurality of frames. First, in reset driving Reset, a driving voltage V1 or V2, depicted in FIG. 3, is applied to the liquid crystals of each pixel, to put all pixels into the planar state PL or the focal conic state FC. In this reset driving, control is executed such that each time all scanning electrodes are selected, the phase of the pulse control signal FR is inverted or not inverted according to the number of pixels for which the image data ON, OFF changes, corresponding to the planar state PL and focal conic state FC. This is as described above.

After reset driving, overwriting corresponding to grayscales is performed to pixels in the planar state PL by means of a plurality of frames, Frame 1 to 3. In the example of FIG. 12, image data H1 to H3 corresponding to grayscales are written to pixels in the three frames Frame1 to 3. That is, by applying a voltage of approximately ±20 V to pixels in the planar state PL in FIG. 3, the pixel grayscale can be gradually made to approach the focal conic state FC. Hence if the write pulse widths are the same in each frame, multi-grayscale display driving with 16 (=$2^4$) grayscales for each pixel is possible.

In this overwrite driving method, control of the inversion or non-inversion of the phase of pulse control signals FR according to the number of write data items changed and the number of data items maintained is performed each time there is a scanning electrode shift within each frame as depicted as FR in FIG. 16, and is also performed when shifting scanning electrodes from the lowermost electrode to the uppermost electrode between frames as depicted as FR in FIG. 16, in order to suppress power consumption in this embodiment.

Figure 17:
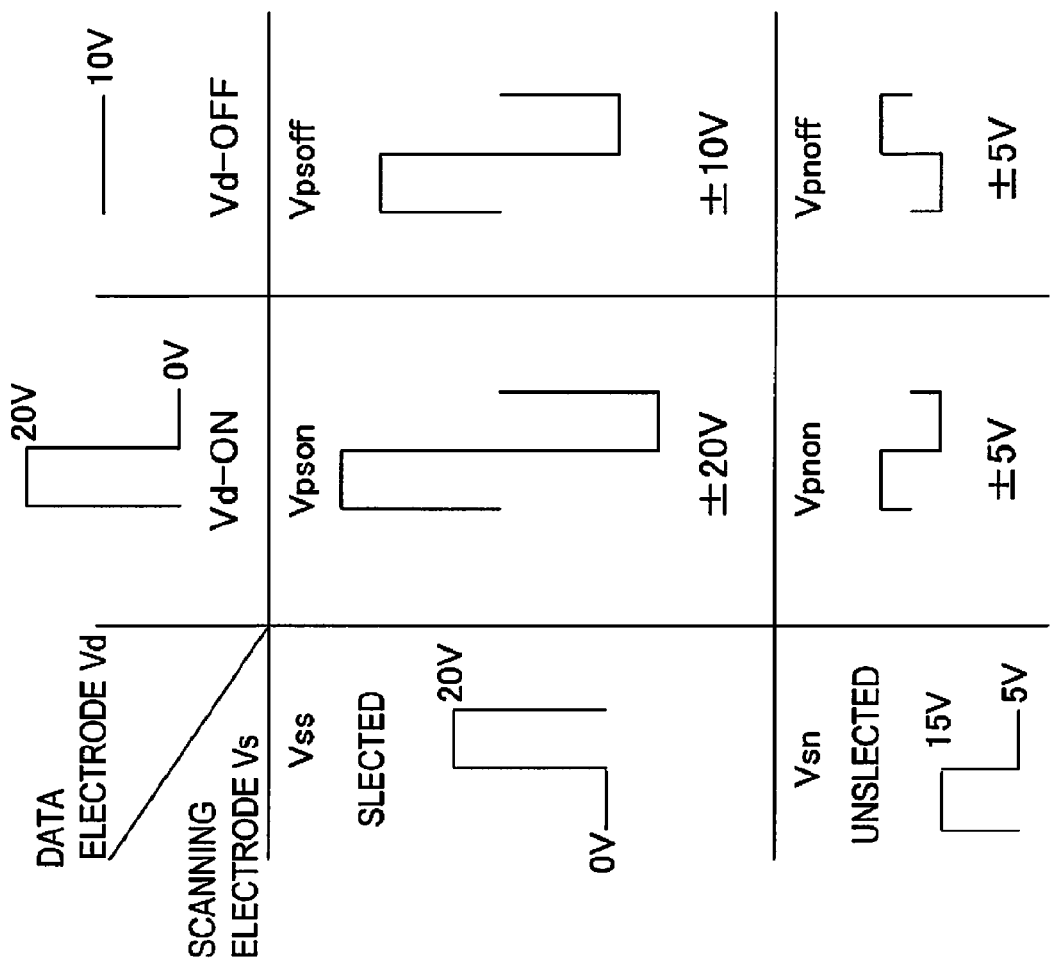
FIG. 17 and FIG. 18 depict an example of driving pulses for grayscale writing in an overwrite driving method.
Figure 18:
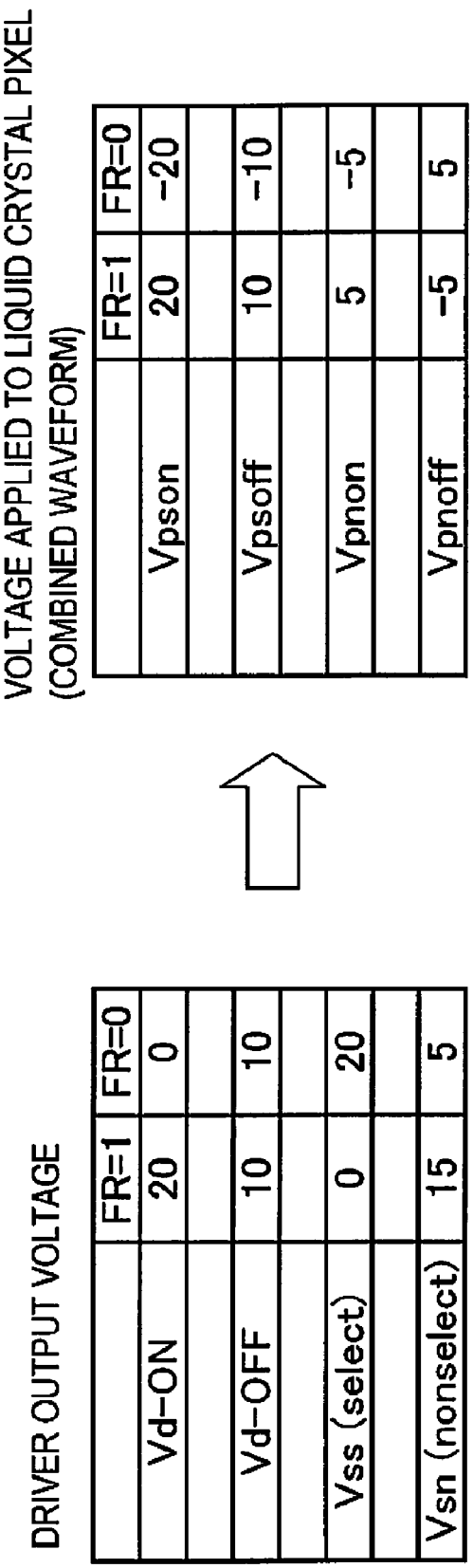

FIG. 17 and FIG. 18 depict an example of driving pulses for grayscale writing in an overwrite driving method. FIG. 17 depict the scan pulses Vss and Vsn applied to scanning electrodes, the data pulses Vd-ON and Vd-OFF applied to data electrodes, and the combined pulses Vpson, Vpsoff, Vpnon, Vpnoff applied to the liquid crystals of pixels which are pulses combining the former. FIG. 18 depicts specific voltages for different pulses corresponding to the pulse control signal FR. These are similar to FIG. 7 and FIG. 8. However, a difference with FIG. 7 and FIG. 8 is that the selected scan pulse Vss is 0/20 V, the unselected scan pulse Vsn is 15/5 V, the data ON data pulse Vd-ON is 20/0 V, and the data OFF data pulse Vd-OFF is 10 V. Hence the combined pulses applied to pixel liquid crystals, which are the AC pixel pulses Vpson, Vpsoff, Vpnon, Vpnoff, are respectively ±20 V, ±10 V, ±5 V, ±5 V, which are lower than the voltages in FIG. 7 and FIG. 8. And, the polarity of the unselected scanning electrode AC pixel pulses Vpnoff is inverted from the polarity of the other AC pixel pulses Vpson, Vpsoff, Vpnon. This is the same as in FIG. 7 and FIG. 8.

Figure 19:
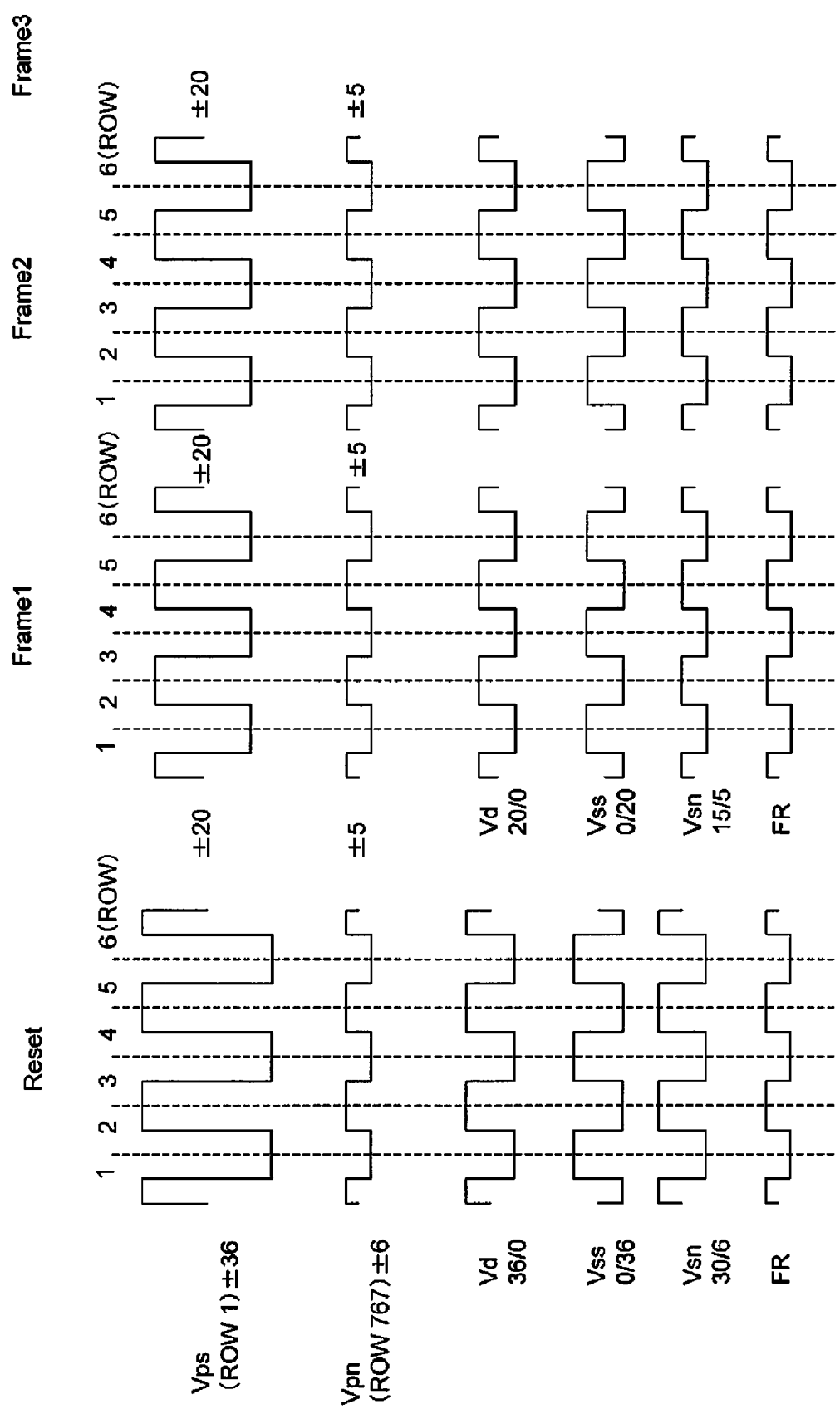
FIG. 19 depicts an example of the different pulse signals in the overwrite driving method.

FIG. 19 depicts an example of the different pulse signals in the overwrite driving method. During the reset interval Reset, the driving pulses depicted in FIG. 7 and FIG. 8 are applied, AC pixel pulses Vps (±36 V) are applied to the liquid crystals of pixels at selected scanning electrodes, and AC pixel pulses Vpn (±6 V) are applied to the liquid crystals of pixels at unselected scanning electrodes. In the example of FIG. 19, the phase of pulse control signals FR is inverted at each scan. Next, in the frames Frame1, 2, 3 in which overwrite driving is performed, the driving pulses depicted in FIG. 17 and FIG. 18 are applied, the AC pixel pulses Vps (±20 V) are applied to the liquid crystals of pixels at selected scanning electrodes, and the AC pixel pulses Vpn (±5 V) are applied to the liquid crystals of pixels at unselected scanning electrodes. In the example of FIG. 19, the phase of pulse control signals FR is inverted at each scan interval. As explained in FIG. 16, a judgment is made as to whether or not to invert the phase of pulse control signals FR between scan intervals within a frame, and between the last scan interval of one frame and the first scan interval of the next frame, and the phase is controlled to enable reduced power consumption.

Figure 20:
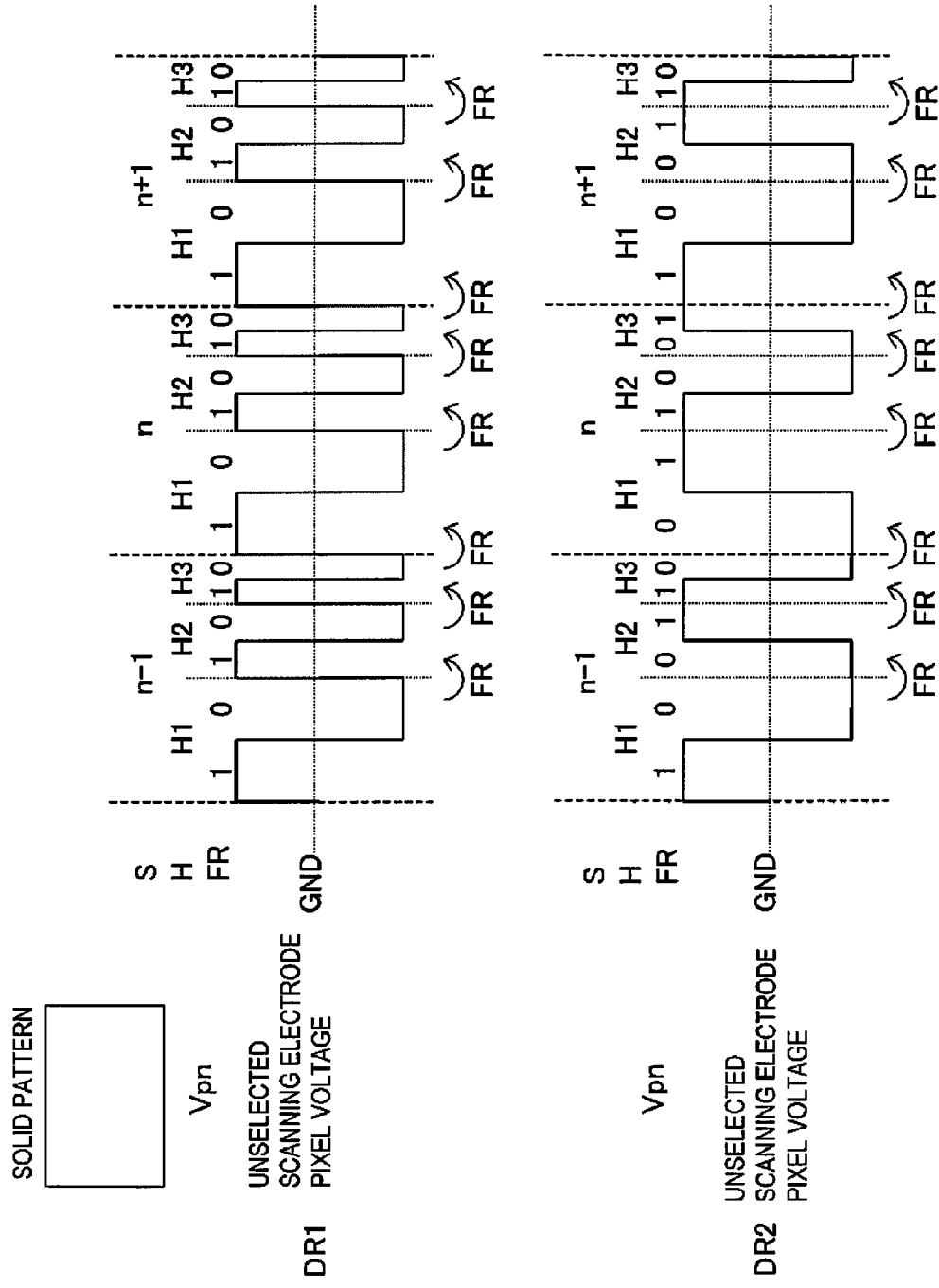

FIG. 20 and FIG. 21 depict an example of pulse signals for another overwrite driving method. In FIG. 16 and FIG. 19, after reset driving, grayscale writing is performed by performing overwrite driving in a plurality of frames using the pulse driving of FIG. 17 and FIG. 18. However, in each scan interval of each frame, H,L or L,H pulse signals are applied one time only. In contrast, in the overwrite driving of FIG. 20 and FIG. 21, in overwrite driving to perform grayscale writing after reset driving, H,L or L,H pulse signals are applied a plurality of times in each scan interval. Hence grayscale write driving is completed in one frame.

FIG. 20 depicts unselected scanning electrode AC pixel pulses Vpn for a case in which three AC pulses are applied, corresponding to three write data values H1, H2, H3 in scan intervals n−1, n, n+1, in an example in which the data pattern for grayscale writing is a solid pattern, so that for example the data is ON in all three overwrites. In this example, the pulse widths of the three AC pulses are weighted as 4:2:1. Whereas in the driving method DR1, the phase (polarity) of pulse control signals FR is not inverted at each of three AC pulses corresponding to the write data H1, H2, H3 (FR=1/0, 1/0, 1/0), in the driving method DR2 the phase (polarity) of the pulse control signal FR is inverted at each of the three AC pulses (FR=1/0, 0/1, 1/0).

And whereas in the driving method DR1 the unselected scanning electrode AC pixel pulses Vpn result in two charge/discharge operations upon each AC pulse application, in the driving method DR2 the unselected scanning electrode AC pixel pulses Vpn have one-half the frequency, and charge/discharge is performed once at each application of an AC pulse, so that the driving method DR2 is preferable in order to reduce power consumption.

FIG. 21 depicts unselected scanning electrode AC pixel pulses Vpn when three AC pulses corresponding to three write data values H1, H2, H3 are applied in the respective scan intervals n−1, n, n+1, in an example in which the data pattern for grayscale writing is a checkerboard pattern, that is, the data for three overwrites alternates as ON, OFF, ON. In this example also, the pulse widths of the three AC pulses are weighted as 4:2:1. Whereas in the driving method DR3 the polarity of the pulse control signals FR is not inverted (FR=1/0, 1/0, 1/0) at each of the three AC pulses corresponding to the write data values H1, H2, H3, in the driving method DR4 the polarity of the pulse control signals FR is inverted (FR=1/0, 0/1, 1/0) at each of the three AC pulses.

Whereas the unselected scanning electrode AC pixel pulses Vpn in the driving method DR4 result in charge/discharge twice upon each AC pulse application, the unselected scanning electrode AC pixel pulses Vpn in the driving method DR3 are at one-half the frequency, and charge/discharge is performed once at each application of an AC pulse, so that the driving method DR3 is preferable in order to reduce power consumption.

As depicted in FIG. 20 and FIG. 21, in a driving method in which a plurality of AC pulses are applied during a scan interval in which one scanning electrode is selected to perform overwriting, when the write data in the previous pulse application interval is compared with the write data in the current pulse application interval at each pulse application interval in which AC pulses corresponding to write data are applied, if the number of pixels for which the write data changes is small, the phase of the pulse control signals FR is inverted as in the driving method DR2, and if the number of pixels for which the write data changes is large, the phase of the pulse control signals FR is not inverted as in the driving method DR3. By this means, the frequency of the AC pixel pulses applied to liquid crystals of pixels of unselected scanning electrodes is lowered, the number of charge/discharge operations is reduced, and power consumption can be reduced.

Further, it is preferable that, between scan intervals as well, control be performed similar to that above so as to invert or not invert the phase of the pulse control signals FR according to whether there are few or many pixels for which the write data changes. That is, phase inversion or non-inversion of the pulse control signals FR is performed for each write data value H1, H2, H3, H1, H2, H3 in FIG. 20.

Figure 22:
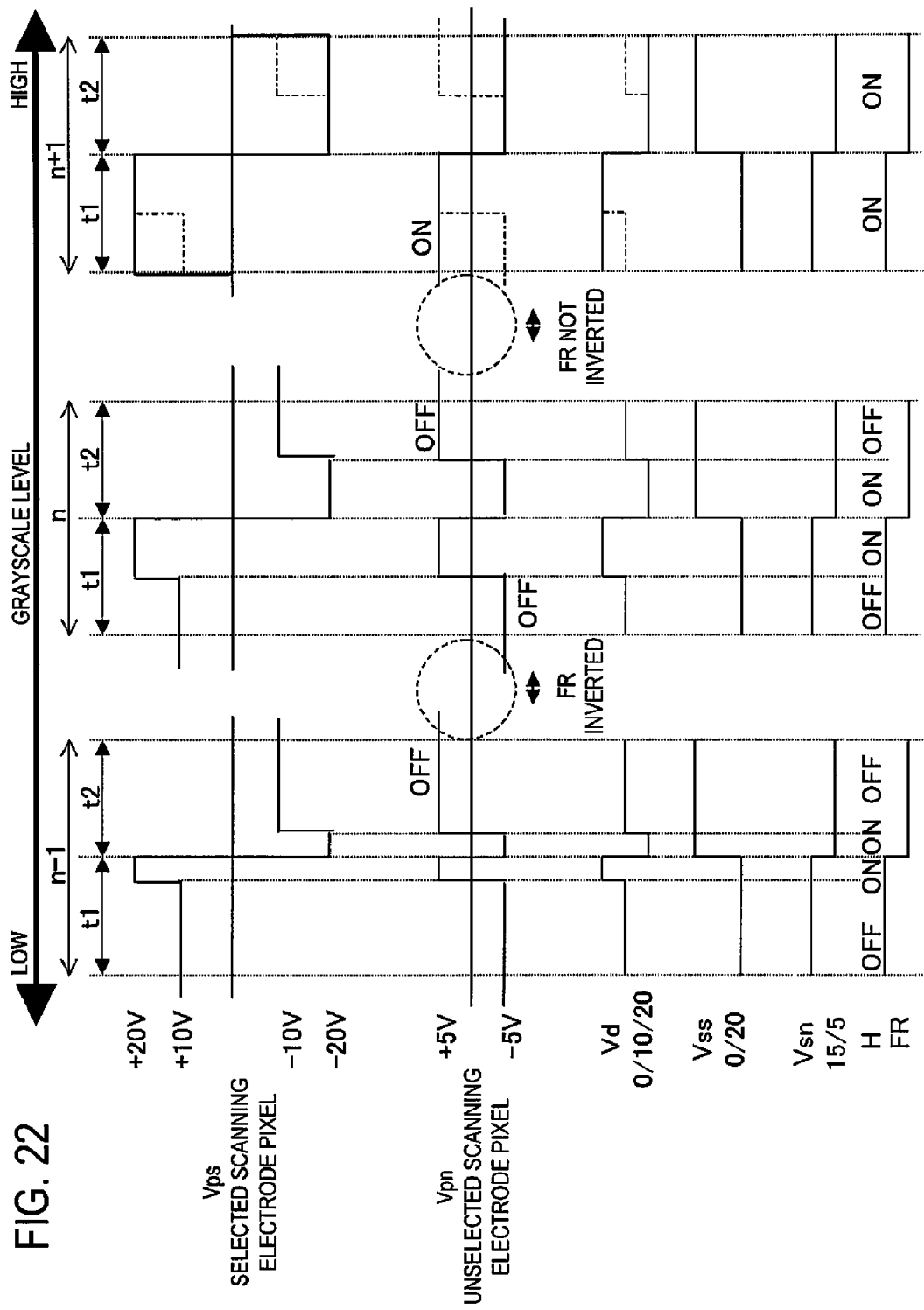
FIG. 22 depicts an example of pulse signals of a pulse width modulation driving method for grayscale display.

FIG. 22 depicts an example of pulse signals of a pulse width modulation driving method for grayscale display. The pulse width modulation driving method, similarly to the overwrite driving method of FIG. 20 and FIG. 21, is a write method in which, after reset writing, AC pulses corresponding to grayscale write data are applied within each scan interval while selecting scanning electrodes sequentially. Hence grayscale writing can be performed within a single frame interval. However, in each scan interval, applied are AC pulses with pulse widths corresponding to grayscale write data; rather than applying AC pulses a plurality of times in each scan interval as in FIG. 20 and FIG. 21, a single AC pulse is applied, and the pulse width of the AC pulse corresponds to the write data.

In the example of FIG. 22, each scan interval n−1, n, n+1 for the scanning electrodes comprises a first half t1 and a second half t2, and the first half t1 and second half t2 are each divided by four. As indicated by the selected scan pulses Vss, unselected scan pulses Vsn, and pulse control signals FR, in each of the scan intervals n−1, n, n+1, one AC pulse is applied in the first half t1 and in the second half t2. However, the first half t1 and second half t2 of each scan interval are divided by four, and data ON intervals are made one among 1:2:3:4.

In FIG. 22, for the scanning electrode n−1, the data OFF and data ON intervals are as 3:1, in the final ¼ interval of the first half t1 and the initial ¼ interval of the second half t2 the data pulse Vd is 20V, 0V, corresponding to data ON, and in other intervals is 10 V, corresponding to data OFF. As a result, the selected scanning electrode AC pixel pulse Vps is +10 V, +20 V in the first half t1, and is −20 V, −10 V in the second half t2. The unselected scanning electrode pixel voltage Vpn is −5 V, +5 V in the first half t1, and is −5 V, +5 V in the second half t2.

For the scanning electrode n, the data OFF and data ON intervals are as 1:1, in the last ½ interval of the first half t1 and the first ½ interval of the second half t2 the data pulse Vd is 20 V, 0 V, corresponding to data ON, and in other intervals is 10 V, corresponding to data OFF. As a result, although there are differences in the pulse width, the selected scanning electrode AC pixel pulses Vps and unselected scanning electrode AC pixel pulses Vpn are the same as for the scanning electrode n−1.

At the scanning electrode n+1, the data ON value is applied for all intervals. Hence in the first half t1 and second half t2 the data pulse Vd is at 20 V, 0 V corresponding to data ON, and as a result the selected scanning electrode AC pixel pulse Vps is +20 V in the first half t1 and is −20 V in the second half t2; further, the unselected scanning electrode AC pixel pulse Vpn is +5 V in the first half t1 and −5 V in the second half t2. The dot-dash lines depict an example in which data OFF and data ON are as 1:1.

As explained above, in a pulse width modulation driving method one AC pulse is applied in each scan interval, and the pulse width of the AC pulse is made to correspond to the write data. Hence when this embodiment is applied to such a pulse width modulation driving method, as depicted in FIG. 22, at the boundaries of scan intervals n−1, n, n+1 the immediately preceding data ON/OFF and immediately following data ON/OFF are compared, and if the number of data changes is small the phase of the pulse control signals FR is inverted, but if the number of data changes is large the phase of the pulse control signals FR is not inverted, and by this means, power consumption in pixels of unselected scanning electrodes can be suppressed.

To explain the example of FIG. 22, between the scan intervals n−1 and n, because the value immediately preceding is data OFF and the value immediately following is data OFF, by inverting the phase of the pulse control signal FR there is no polarity inversion of the unselected scanning electrode AC pixel pulses Vpn, so that power consumption can be reduced. In FIG. 22, however, the FR phase is not inverted. On the other hand, between the scan intervals n and n+1, because the value immediately preceding is data OFF and the value immediately following is data ON, by not inverting the phase of the pulse control signal FR there is no polarity inversion of the unselected scanning electrode AC pixel pulses Vpn, so that power consumption can be reduced. In FIG. 22 the FR phase is not inverted, so that polarity inversion of the AC pixel pulses Vpn does not occur.

To summarize the above, in a driving method in which scanning electrodes are selected sequentially and data ON or data OFF AC pulses are applied in each scan interval, as in reset write driving as FIGS. 12 and 13, the number of changed data values and the number of unchanged data values are compared upon each interval of application of AC pulses corresponding to a data pattern, that is, upon each scan interval, and control based on Table 1 is executed to invert or not to invert the phase of the pulse control signals FR.

In an overwrite driving method, when performing grayscale writing in a plurality of frames as FIGS. 16 and 19, control is executed to invert or not invert, based on Table 1, the phase of the pulse control signals FR at each scan interval in which AC pulses are applied, similarly to the above-described reset write driving. FR signals are similarly controlled from frame to frame as well.

In an overwrite driving method also, when applying a plurality of AC pulses within a scan interval to perform grayscale writing as FIGS. 20 and 21, control is executed to invert/not invert the FR phase, based on Table 1, in each interval H1, H2, H3 in which AC pulses are applied.

And, in a pulse width modulation driving method as FIG. 22, AC pulse is applied once in a scan interval, so that at each scan interval control is executed to invert/not invert the FR phase, based on Table 1, corresponding to the immediately preceding data and the immediately following data. Even a the pulse width modulation driving method, if AC pulses are applied a plurality of times in a scan interval, control is executed to invert/not invert the FR phase, based on Table 1, in each interval in which AC pulses are applied, corresponding to the immediately preceding data and the immediately following data.

Figure 23:
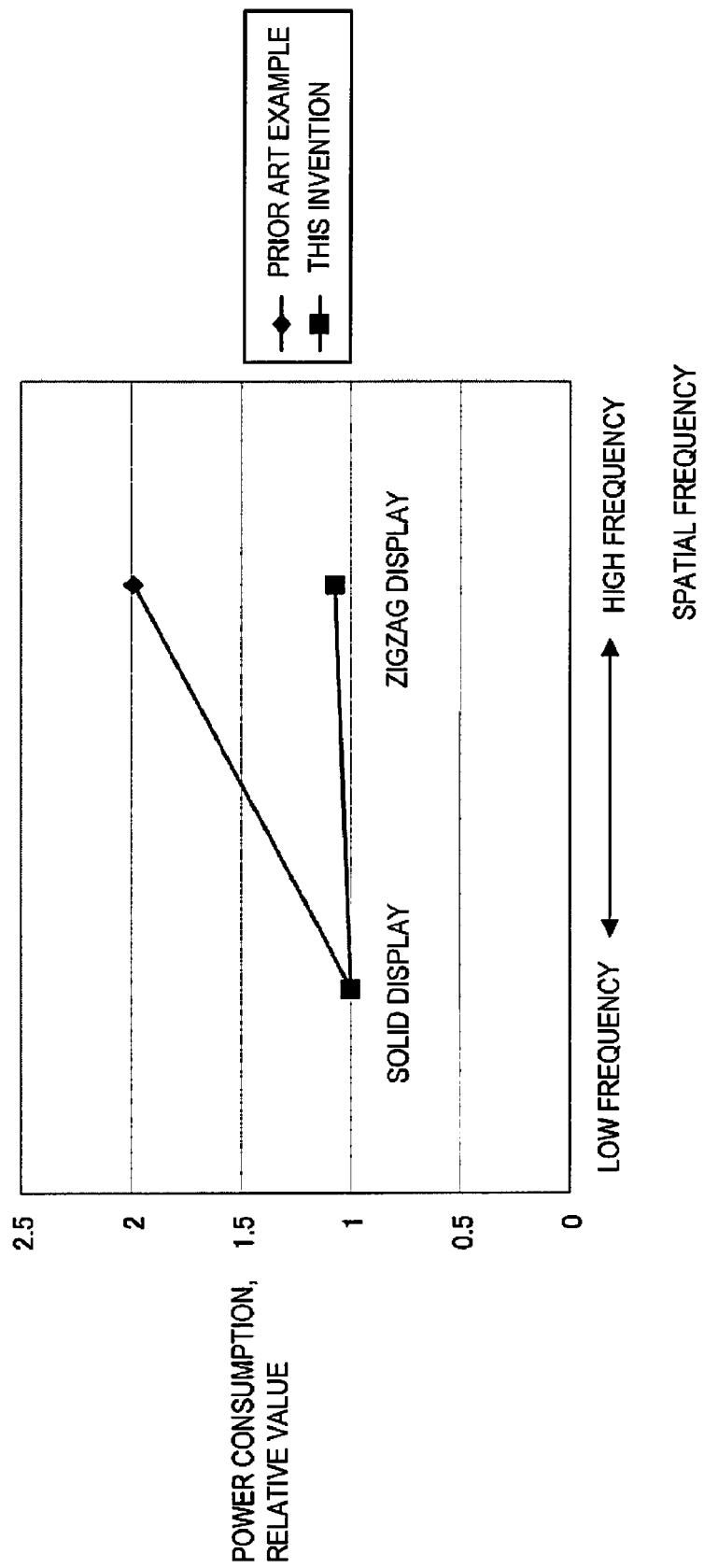
FIG. 23 depicts the effect of reduction of power consumption when executing control of pulse control signals FR in this embodiment.

FIG. 23 depicts the effect of reduction of power consumption when executing control of pulse control signals FR in this embodiment. The horizontal axis indicates the spatial frequency with which data ON and OFF values change, and the vertical axis indicates relative values of the panel power consumption. When the phase of pulse control signals FR is inverted normally as in the example of the prior art, power consumption increases for a checkerboard display compared with a solid display. But when, as in this embodiment, control is executed to invert or not invert the phase of pulse control signals FR according to the data pattern, power consumption can be made approximately the same for checkerboard display as for solid display.

By means of this embodiment, power consumption can be reduced in a liquid crystal display panel device using cholesteric liquid crystals, for which applications are anticipated in electronic paper and other areas.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A display device, comprising:
a liquid crystal display panel, having a first substrate on which are formed a plurality of scanning electrodes extending in a first direction, a second substrate on which are formed a plurality of data electrodes extending in a second direction different from the first direction, and a liquid crystal layer formed between the first and second substrates;
a scanning electrode driving circuit which applies, to the plurality of scanning electrodes, scan pulses having combinations of different voltage levels according to whether a scanning electrode is selected or unselected;
a data electrode driving circuit which applies, to the plurality of data electrodes, data pulses having combinations of different voltage levels according to write data, corresponding to the scan pulses; and
a driving control circuit which supplies, to the scanning electrode driving circuit and data electrode driving circuit, pulse control signal which controls the voltage levels of the scan pulses and data pulses;
wherein the scanning electrode driving circuit and data electrode driving circuit respectively control the scan pulses and data pulses at voltage levels according to the pulse control signal, and
the driving control circuit inverts or does not invert the phase of the pulse control signal, at each application interval of the scan pulses, according to a relation between the number of changed values and the number of unchanged values of the write data.

2. The display device according to claim 1, wherein
AC pixel pulses having a voltage difference of the data pulses and scan pulses are applied to pixels at intersections of the scanning electrodes and the data electrodes,
a first AC pixel pulse at pixels of the intersections of selected scanning electrode and data electrodes and a second AC pixel pulse at pixels of the intersections of unselected scanning electrodes and data electrodes with data ON have a phase inverted to a phase of a third AC pixel pulse at pixels of intersections of unselected scanning electrodes and data electrodes with data OFF, and
the driving control circuit controls to invert the phase of the pulse control signal when the number of unchanged values is greater than the number of changed values in the write data, and controls not to invert the phase of the pulse control signal when the number of unchanged values is less than the number of changed values in the write data.

3. The display device according to claim 2, wherein the scanning electrode driving circuit and data electrode driving circuit are configured by a liquid crystal driver with four-value outputs.

4. The display device according to claim 1, wherein
the scanning electrode driving circuit sequentially selects the plurality of scanning electrodes, applies scan pulse for selected scanning electrode to the selected scanning electrode, and applies scan pulse for unselected scanning electrode to unselected scanning electrodes other than the selected scanning electrode, and
the data electrode driving circuit applies, to the plurality of data electrodes, data pulses according to write data to the pixels of the selected scanning electrode during the intervals in which the scanning electrodes are selected.

5. The display device according to claim 1, wherein
the scanning electrode driving circuit sequentially selects the plurality of scanning electrodes, applies scan pulse for selected scanning electrode to the selected scanning electrode, and applies scan pulse for unselected scanning electrode to unselected scanning electrodes other than the selected scanning electrode,
the data electrode driving circuit applies, to the plurality of data electrodes, data pulses according to write data to the pixels of the selected scanning electrode during the scan intervals in which the scanning electrodes are selected,
the data electrode driving circuit applies data pulses corresponding to a plurality of bits of write data in a plurality of frame intervals, and
at the time of a transition from a last scan pulse application interval of a first frame interval to a first scan pulse application interval of a second frame interval succeeding the first frame interval, the driving control circuit inverts or does not invert the phase of the pulse control signal, according to the relation between the number of changed values and the number of unchanged values of the write data.

6. The display device according to claim 1, wherein
the scanning electrode driving circuit sequentially selects the plurality of scanning electrodes, and during the scan interval in which the scanning electrodes are selected, applies scan pulse for selected scanning electrode to the selected scanning electrode a plurality of times, and applies scan pulse for unselected scanning electrode to unselected scanning electrodes other than the scanning electrode a plurality of times,
during the scan interval, the data electrode driving circuit applies, to the plurality of data electrodes, a plurality of data pulses corresponding to a plurality of bits of write data to the pixels of the selected scanning electrode, and
upon each interval of application of the scan pulses in the scan interval, the driving control circuit inverts or does not invert the phase of the pulse control signal according to the relation between the number of changed values and the number of unchanged values of the write data, and also at the time of transition from a scan interval to the next scan interval, inverts or does not invert the phase of the pulse control signal according to the relation between the number of changed values and the number of unchanged values of the write data.

7. The display device according to claim 1, wherein
the scanning electrode driving circuit sequentially selects the plurality of scanning electrodes, and during the scan interval in which the scanning electrodes are selected, applies scan pulse for selected scanning electrode to the selected scanning electrode, and applies scan pulse for unselected scanning electrode to unselected scanning electrodes other than the scanning electrode,
during the scan interval, the data electrode driving circuit applies, to the plurality of data electrodes, data pulses with pulse widths corresponding to a plurality of bits of write data to the pixels of the selected scanning electrode, and
upon each interval of application of the scan pulses in the scan interval, the driving control circuit inverts or does not invert the phase of the pulse control signal according to the relation between the number of changed values and the number of unchanged values of the write data.

8. The display device according to claim 2, wherein
when the peak value of the first AC pixel pulses is V1, and the peak value of the second and third AC pixel pulses is V2, the liquid crystal display panel has the number of unselected scanning electrodes greater than substantially $(V1/V2)^2$ times the number of selected scanning electrode.

9. A display device, comprising:

a liquid crystal display panel, having a first substrate on which are formed a plurality of scanning electrodes extending in a first direction, a second substrate on which are formed a plurality of data electrodes extending in a second direction different from the first direction, and a liquid crystal layer formed between the first and second substrates;

a scanning electrode driving circuit which applies, to the plurality of scanning electrodes, scan pulses having combinations of different voltage levels according to whether a scanning electrode is selected or unselected;

a data electrode driving circuit which applies, to the plurality of data electrodes, data pulses having combinations of different voltage levels according to write data, corresponding to the scan pulses; and a driving control circuit which supplies, to the scanning electrode driving circuit and data electrode driving circuit, pulse control signal which controls the voltage levels of the scan pulses and data pulses;

wherein the scanning electrode driving circuit and data electrode driving circuit control the scan pulses and data pulses at voltage levels according to the pulse control signal, and the driving control circuit inverts or does not invert the phase of the pulse control signal at each scan interval of the scan electrodes, according to a result of comparison of the number of changed values and the number of unchanged values of the write data.

10. The display device according to claim 9, wherein the driving control circuit further inverts or does not invert the phase of the pulse control signal at each application interval of the scan pulses, according to the result of comparison of the number of changed values and the number of unchanged values of the write data.

11. The display device according to claim 1, wherein the liquid crystal layer comprises liquid crystals having memory properties.

12. The display device according to claim 11, wherein the liquid crystals are liquid crystals which form a cholesteric phase.

* * * * *